United States Patent [19]

Tabb et al.

[11] Patent Number: 5,603,025
[45] Date of Patent: Feb. 11, 1997

[54] METHODS FOR HYPERTEXT REPORTING IN A RELATIONAL DATABASE MANAGEMENT SYSTEM

[75] Inventors: Lloyd Tabb, Santa Cruz; Conrad Herrmann, Soquel, both of Calif.

[73] Assignee: Borland International, Inc., Scotts Valley, Calif.

[21] Appl. No.: 283,127

[22] Filed: Jul. 29, 1994

[51] Int. Cl.⁶ .................................................. G06F 17/30
[52] U.S. Cl. .................................... 395/602; 364/DIG. 1; 364/282.1; 364/283.4
[58] Field of Search ..................................... 395/600, 602

[56] References Cited

U.S. PATENT DOCUMENTS

| | | | |
|---|---|---|---|
| 5,133,068 | 7/1992 | Crus et al. | 395/600 |
| 5,263,167 | 11/1993 | Conner, Jr. et al. | 395/700 |
| 5,333,327 | 7/1994 | Stefanopoulos et al. | 395/12 |
| 5,408,659 | 4/1995 | Cavendish et al. | 395/650 |
| 5,412,774 | 5/1995 | Agrawal et al. | 395/157 |
| 5,423,043 | 6/1995 | Fitzpatrick et al. | 395/700 |
| 5,428,776 | 6/1995 | Rothfield | 395/600 |

*Primary Examiner*—Wayne Amsbury
*Attorney, Agent, or Firm*—John A. Smart; David N. Slone

[57] ABSTRACT

A system of the present invention includes a relational database management system (RDBMS) having a hypertext report writing module. Methods are described for automatically recognizing relations between reports which are generated from the same or related database tables. The system automatically embeds (or assists the user in embedding) appropriate hypertext links so that information from one report may be cross-referenced immediately with information in another, related report. Drill-down hypertext reports of increasing level of detail are illustrated. In addition to drill-down reports, the system may create comprehensive hypertext reports for automatically tying together information which is related through underlying table relations but which ordinarily appears in different reports. By automatically placing hypertext links or cross-indexes between reports, the system ties together relatable information into a single, cross-indexed hypertext report.

40 Claims, 33 Drawing Sheets

Paradox for Windows Help

File  Edit  Bookmark  Help
Contents  Search  Back  History  <<  >>

Common Tasks in Paradox

Paradox gives you a wide variety of ways to store, display, and present data. The components you use to store and present your data are called objects. An object can be a table, form, report, query, script, or library. These objects make up the Paradox object set.

You create each object in Paradox in its own special window. Click one of the icons below to see information on tasks for creating an object in its window.

420

This is the Form window, where you design and run forms

This is Library window, where you build libraries of frequently-used ObjectPAL routines This is the Query window, where you design and run queries
425

This is the Report window, where you design and run reports

This is the Script window, where you edit and run ObjectPAL methods

This is the Folder window, where you can quickly view and access the contents of the working directory This is the Table window, where you enter and view data in tables See Also
Tasks common to all windows:

```
┌─────────────────────────────────────────────────────────────────────┐
│                      Paradox for Windows Help                    ▲▼ │
├─────────────────────────────────────────────────────────────────────┤
│ File  Edit  Bookmark  Help                                          │
│ Contents │ Search │ Back │ History │  <<  │  >>                     │
├─────────────────────────────────────────────────────────────────────┤
│                                                                     │
│  📄  Reports                                                        │
│                                                                     │
│  Using Paradox reports, you can display the data, graphics,         │
│  calculations, and headings from tables any way you want, and       │
│  then print the result. You can also combine information from       │
│  several tables and include special design objects to give your     │
│  report the look you want.                                          │
│                                                                     │
│  The tools for creating and modifying a report are like the tools   │
│  you use to create and modify forms. However, because a report is   │
│  designed to be printed, rather than viewed onscreen, some          │
│  concepts, functions, and tools are unique to report design.        │
│                                                                     │
│  You create reports in the Report Design window. You can preview    │
│  them in the Report window before printing. To enter or change      │
│  data, you must be in a Form or Table window.                       │
│                                                                     │
│  See Also                                                           │
│  Report window tasks ─── 435                                        │
│  Tasks common to all windows                                        │
│  Report window commands                              430            │
│  Editing data in a Table window                      ───            │
│                                                                     │
└─────────────────────────────────────────────────────────────────────┘
```

*FIG. 4C*

Paradox for Windows Help

File  Edit  Bookmark  Help

Contents | Search | Back | History | << | >>

Creating a New Report  *440*

To create a new report from the Desktop, choose File | New | Report or right-click the Open Report SpeedBar button and select New. Paradox opens the Data Model dialog box, where you can specify the tables you want to use in the report.

Creating a new report takes you through two or three dialog boxes, depending on your choices. Here's the general road map:

First the Data Model dialog box opens. Choose which tables you want to use and how they are related. You can always change this later, so do not worry if you do not get everything right.

- If you do not choose any tables, choose OK to open the Page Layout dialog box. Choose page sizes and whether you are designing for printer or screen.
- If you choose a single table, the Single-table Design Layout dialog box opens.
- If you choose multiple tables with a 1 → M relationship, the Multi-table Design Layout dialog box opens.

Both of these dialog boxes let you make selections to generate a starting layout with most of your data objects on it. You can then modify this design in the design window.

Adding a table

To add a table, either

- Select the table from the list and click the Add Table arrow.
- Double-click the table name.

The table name appears in the data model panel.

If you want to use a table not listed in the dialog box, choose Browse. This opens the Browser, where you can locate tables in a different directory.

Removing a table

To remove a table from the data model panel, select it and click the left arrow.

When you place a table in the data model panel and choose OK, Paradox displays the Single-table Design Layout dialog box. Use this dialog box to preview layout options for the report fields.

*FIG. 4E*

Sample Hypertext Report

File  Edit  Bookmark  Help

Contents | Search | Back | History

Orders by Customer

Dalton Semiconductor

| Order No. | Date | Amount |
|---|---|---|
| 15902 | 01/25/94 | $3645.92 |
| 17803 | 02/27/94 | $1144.82 |
| 18911 | 04/14/94 | $3131.88 |
| 20031 | 05/25/94 | $1478.93 |
| 21219 | 06/03/94 | $5435.33 |
| 23336 | 07/25/94 | $1399.46 |

*RTF HYPERTEXT CODES*
*700*

$+Customers·by·Representative¶
CUSTOMERS_BY_REPRESENTATIVE_021¶ — 705
¶
Emerson,·James¶
↑ ↑ ↑ ↑ ↑ ↑ ↑ Acme·Inc·ORDERS_BY_CUSTOMER_00348,·140·East·St.,·Houston,·TX¶
Baker·Assoc·ORDERS_BY_CUSTOMER_00537 3,·222·Story·Ln.,·Dallas,·TX¶
California·Realty·ORDERS_BY_CUSTOMER_01247,·33·Michael,·Huntsville,·AL¶
Dalton·Semiconductor·ORDERS_BY_CUSTOMER_00569,·63479·Thompson·Ln.,·Austin,·TX¶
Global·Enterprises·ORDERS_BY_CUSTOMER_00399,·25252·Main·St.,·New·Orleans,·LA¶
Jason·Medical·Labs·ORDERS_BY_CUSTOMER_02288,·99876·Winchester·Blvd.,·Scottsdale,·AZ¶
↖ 710

*FIG. 7A*

METHODS FOR HYPERTEXT REPORTING IN A RELATIONAL DATABASE MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to modeling information in a data processing system, such as a Database Management System (DBMS).

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand. Of these systems, ones which are of particular interest to the present invention are Relational Database Management Systems (RDBMSs).

The concept of relational databases is perhaps best introduced by reviewing the problems surrounding traditional or non-relational systems. In a traditional database system, the task of retrieving information of interest (i.e., answering a "database query") is left to the user; that is, the user must give detailed instructions to the system on exactly how the desired result is to be obtained.

Consider the example of a simple query: "Who are the teachers of student John Smith?" In a traditional system, several explicit instructions are required before the query can be answered. One instruction, for instance, is typically to instruct the system to allocate sections in memory for data to be read from a storage disk. Another command may tell the system which disk files to open and read into the allocated memory for processing. Still other commands may specify particular search strategies, such as use of specific indexes, for speeding up the result of the query. And still even further commands may be needed for specifying explicit links between two or more files so that their data may be combined. Thus, instead of just telling the system "what" is desired (i.e., the desired data result as expressed in a query expression), one must specify internal procedures (i.e., the "how") for obtaining the data. Even for a simple query, such as that above, the task is complex, tedious, and error-prone.

From the user's perspective, such details—ones directed to the physical implementation—are completely irrelevant; the user is interested only in the result. Thus, the lack of separation of logical operations from the physical representation of the data (i.e., how it is internally stored and accessed by the system) in traditional systems burdens users with unnecessary complexity. Moreover, as traditional database products employ proprietary data access procedures, knowledge of one product is not necessarily helpful in use of another. And where database systems differ, their practitioners cannot effectively communicate with one another.

In 1970, Dr. E. F. Codd invented the "relational model", a prescription for how a DBMS should operate. The relational model provides a foundation for representing and manipulating data, that is, a way of looking at data. The model includes three basic components: structure, integrity, and manipulation. Each will be described in turn.

The first of these, structure, is how data should be presented to users. A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Ideally, data in a relational system is perceived by users as tables and nothing but tables. This precludes the user from seeing explicit connections or links between tables, or having to traverse between tables on the basis of such links. It also precludes user-visible indexes on fields and, in fact, precludes users from seeing anything that smacks of the physical storage implementation. Thus, tables are a logical abstraction of what is physically stored.

The integrity aspect, on the other hand, dictates that every relation (i.e., table) should have a unique, primary key to identify table entries or rows. The integrity of the data for the user is of course crucial. If accuracy and consistency of the data cannot be achieved, then the data may not be relied upon for decision-making purposes.

Data manipulation, the last component, may be thought of as cut-and-paste operators for tables. Data manipulation is of course the purpose for which databases exist in the first place. The superiority of manipulating tables relationally (i.e., as a whole, or sets of rows) is substantial. Users can combine data in various tables logically by matching values in common columns, without having to specify any internal details or the order in which tables are accessed; this provides users with a conceptual view of the database that is removed from the hardware level. Non-relational DBMSs, in contrast, require complex programming skills that form an inherently unreliable means to interact with databases.

The general construction and operation of a database management system is known in the art. See e.g., Date, C., *An Introduction to Database Systems,* Volume I and II, Addison Wesley, 1990; the disclosures of which are hereby incorporated by reference.

Today, relational systems are everywhere—commonly seen operating in corporate, government, academic settings, and other shared environments. A typical installation will employ one of the popular UNIX-based RDBMS running on a minicomputer. By submitting queries to the DBMS from a remote terminal (e.g., using a SQL "query editor"), users are often able to handle many of their own data processing needs directly. Thus, relational technology is not only just another way to build a database system, but it also offers a set of underlying principles that provide very direct practical benefits to the user.

A chief aim of the RDBMS is to provide company management with timely reports from which meaningful business decisions can be made. If back orders, say, at a given branch store are higher than at other branches, prompt attention can rectify the position, but only if the reporting system clearly indicates the possible anomaly to those capable of taking action.

Traditionally, the database system has produced printed daily, weekly or monthly order-status reports for branches and consolidated reports for head office. There are several problems with the way current databases are used to generate these regular printed reports for management, however. First, different management levels require different data, so either the number of distinct reports tends to proliferate or the system needs to produce a complex, combined form from which each manager extracts his or her figures. Second, to solve what may turn out to be an isolated problem, such as a fluctuation in back orders for a particular salesperson, customer, or branch, a new or revised report is produced and perpetuated, adding to the paper and data overload. Third, to investigate anomalies, the manager may have to examine several printed reports and/or make ad hoc queries on the database.

All told, ad hoc database queries, even with the help of SQL (Structured Query Language) and other query languages, are often difficult or impossible for most managers, so a time-consuming request has to be made to skilled database staff or to the database administrator. The present invention solves the problem by offering database-illiterate managers simple, direct on-line access not only to their usual reports but also to related data needed to investigate and rectify discrepancies.

SUMMARY OF THE INVENTION

A system of the present invention comprises a relational database management system (RDBMS), where information is maintained in one or more database tables for easy, efficient storage and retrieval. In addition to database tables, the system provides "design documents"—forms and reports—which allow a user to customize how his or her data are presented, including formats which are not tabular. Design documents can also link together different tables, so that information stored in separate tables appears to the user to come from one place.

The system of the present invention includes a hypertext report writer which can identify relations between reports which contain similar information (i.e., are based on relatable database tables). Upon identifying relations, the system may place appropriate hypertext links which cross-reference information in one report to information in another, related report. As one application of the present invention, the system may automatically generate "drill-down" reports using cross-indexes which are based on these relations.

A "hypertext report" is generally constructed by combining two or more traditional reports. By automatically placing hypertext links or cross-indexes between reports, the system ties together relatable information into a single, cross-indexed hypertext report.

The present invention may be advantageously applied in any setting where timely access is required to detailed information, particularly where it is undesirable to place the report on paper, and where it is not practical for the report reader to perform queries on the underlying database. For instance, instead of having to review lengthy paper reports, a busy executive could review summary information in hypertext format. The executive could then drill-down, using hypertext navigation techniques, to the detailed information which is of particular interest. Detailed information which is not of interest is hidden, so the executive need not waste time reviewing it. Moreover, since the hypertext report is generated electronically, the entire process may be automated so that an electronic copy of a hypertext report may be automatically generated and delivered on a timely basis (e.g., daily). By placing report information in hypertext format, the system of the present invention allows the reader to employ other features of Hypertext, such as "Content" and "Search" generation, Browse sequences, Topic breaks, and the like.

BRIEF DESCRIPTION OF THE DRAWINGS

FIGS. 3C–E are bitmap screenshots illustrating use of the Desktop's client area for displaying and manipulating major objects of the system, including table objects, form objects, report objects, and the like.

FIGS. 4A–E are bitmap screenshots illustrating use of a hypertext document, including use of jump text (via hypertext links).

FIGS. 6A–E are bitmap screenshots illustrating creation of a hypertext report, using information from the tables of FIG. 3F.

FIG. 7A is a bitmap screenshot illustrating RTF hypertext code having "hidden" identifiers for marking "topic" and "jump to" locations.

Figure 1A:
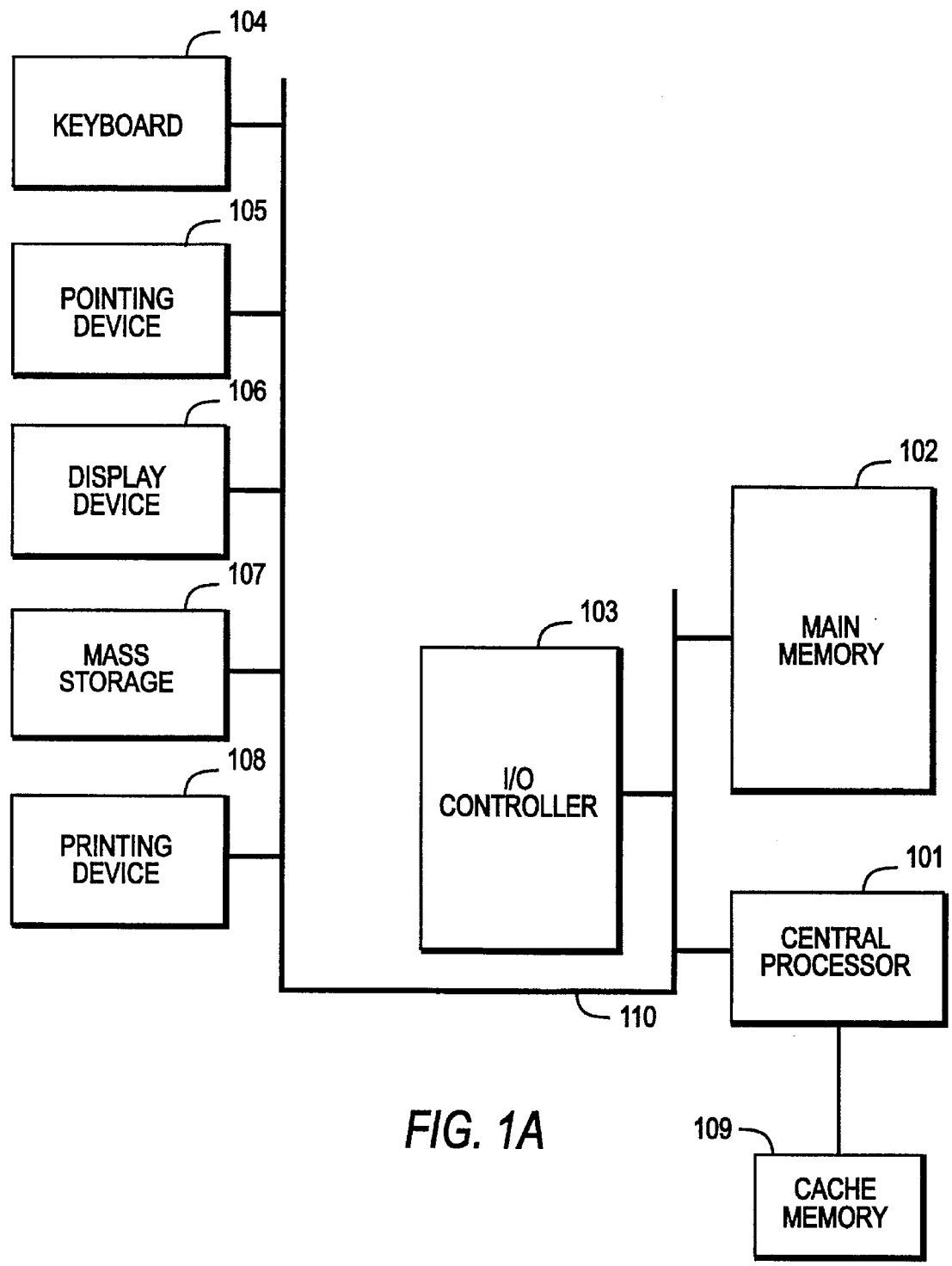
FIG. 1A is a block diagram of a computer system in which the present invention may be embodied.

GLOSSARY alternate keys: Candidate keys (see below) which are not selected as the primary key for a table.

alphanumeric field: A field containing letters, numbers, or a combination of both.

binary field: A field used to store data the system cannot interpret (without additional instructions). A common use of a binary field is to store sound.

bind: To associate a form or report with one or more tables. The document then takes its data from the table(s) to which it is bound.

blank field: A field that does not contain a value.

candidate keys: Keys comprising all sets of column combinations with unique values for a table. One of these is selected as the primary key; the rest remain alternate keys.

cascade: To use referential integrity to update child tables when a value changes in the parent table.

command: a word on a menu or button that one chooses to perform an action.

composite key: A key comprised of two or more fields of a table which, together, provide a unique value for each record of the table.

data: The information stored in a table.

data integrity: The assurance that the values in a table are protected from corruption.

data type: The kind of data a field can contain. Data types include alphanumeric, number, currency, date, short number, memo, formatted memo, binary, graphic, and OLE.

database: An organized collection of information.

Database Management System (DBMS): System that controls the organization, storage, and retrieval of information in a database.

default: What the system automatically does or looks like in the absence of an overriding command.

design document: A form or report that one creates or modifies in a design window.

design object: An object one can place in forms and reports. One creates design objects using toolbar tools in a design window.

design window: The window where one creates or modifies the design of a document. If one is viewing data in a Form or Report window, he or she can select the Design button to open the corresponding design window for that document.

Desktop: The main window in system. The Desktop is the highest level of interaction with all system objects.

detail table: In multi-table relationships, the table whose records are subordinate to those of the master table.

dialog box: A box that requests or provides information. Many dialog boxes present options to choose among before one can perform an action. Other dialog boxes display warnings or error messages.

domain: A set of permissible values (i.e., pool of values) for one or more (shared) columns that have the same meaning.

field: A column of information in a table. A collection of related fields makes up one record.

field type: The type of data a field can contain. Field types include alphanumeric, number, currency, date, short number, memo, formatted memo, binary, graphic, and OLE.

field value: The data contained in one field of a record. If no data is present, the field is considered blank.

file: A collection of information stored under one name on a disk. For example, the system tables are stored in files.

form: An alternate presentation or view of a table's data. A multi-table form can display data from several tables at once.

group: (1) In a report or query, a set of records that either have the same value in one or more fields; fall within a range of values; or are displayed in a fixed number of records; and (2) to collectively identify various objects as a single entity.

index: A file that determines an order in which the system can access the records in a table. A system table's key establishes its primary index.

inspect: To view or change an object's properties. To inspect an object, one would either right-click it or select it with the keyboard and press F6. The object's menu appears. One selects from the menu the property he or she wants to change.

key: A field or group of fields in a system table used to order records or ensure referential integrity. Establishing a key has three effects: (1) The table is prevented from containing duplicate records; (2) The records are maintained in sorted order based on the key fields; and (3) A primary index is created for the table.

link: To establish a relationship between tables by linking corresponding fields.

logical value: A value (True or False) assigned to an expression when it is evaluated.

lookup table: A table that assures that a value entered in one table matches an existing value in another table.

Main menu: The menu bar across the top of the system Desktop.

master table: In a multi-table relationship, the primary table of a user's data model. If one has only one table in his or her data model, that table is the master table.

multi-record: Refers to an object that displays several records at once in a form or report.

normalized data structure: An arrangement of data in tables in which each record includes the fewest number of fields necessary to establish unique categories. Rather than using a few redundant fields to provide all possible information within a single table, normalized tables distribute information over many tables using fewer fields. Normalized tables provide more flexibility in terms of analysis.

object: A table, form, report, query, script, or library. All entities that can be manipulated in the system are objects.

OLE: OLE stands for Microsoft Windows' Object Linking and Embedding. One can use OLE to insert files from OLE servers into system tables or OLE objects.

primary index: An index on the key fields of a system's table. A primary index (1) Determines the location of records; (2) Lets one use the table as the detail in a link; (3) Keeps records in sorted order; and (4) Speeds up operations.

prompt: Instructions displayed on the screen. Prompts ask for information or guide a user through an operation.

properties: The attributes of an object. One must right-click an object to view or change its properties.

query: A question one asks the system about information in his or her tables. The query can be a simple question about the information in a single table or a complex question about information in several tables.

record: A horizontal row in a system table that contains a group of related fields of data.

record number: A unique number that identifies each record in a system table.

referential integrity: A way of ensuring that the ties between like data in separate tables is maintained.

report: Information from tables printed on paper or previewed onscreen.

secondary index: An index used for linking, querying, and changing the view order of tables.

set: A specific group of records (e.g., about which a user intends to ask questions).

structure: The arrangement of fields in a table.

table: A structure made up of rows (records) and columns (fields) that contains information.

toolbar: The set of buttons and tools for frequently performed tasks. The toolbar is displayed under the menu bar and changes according to the window one is using.

unique index: An index capable of uniquely identifying each record for which a value is given in a table.

validity check: A constraint on the values one can enter in a field.

DETAILED DESCRIPTION OF A PREFERRED EMBODIMENT

The following description will focus on the presently preferred embodiment of the present invention, which is operative in the Microsoft® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an onchip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
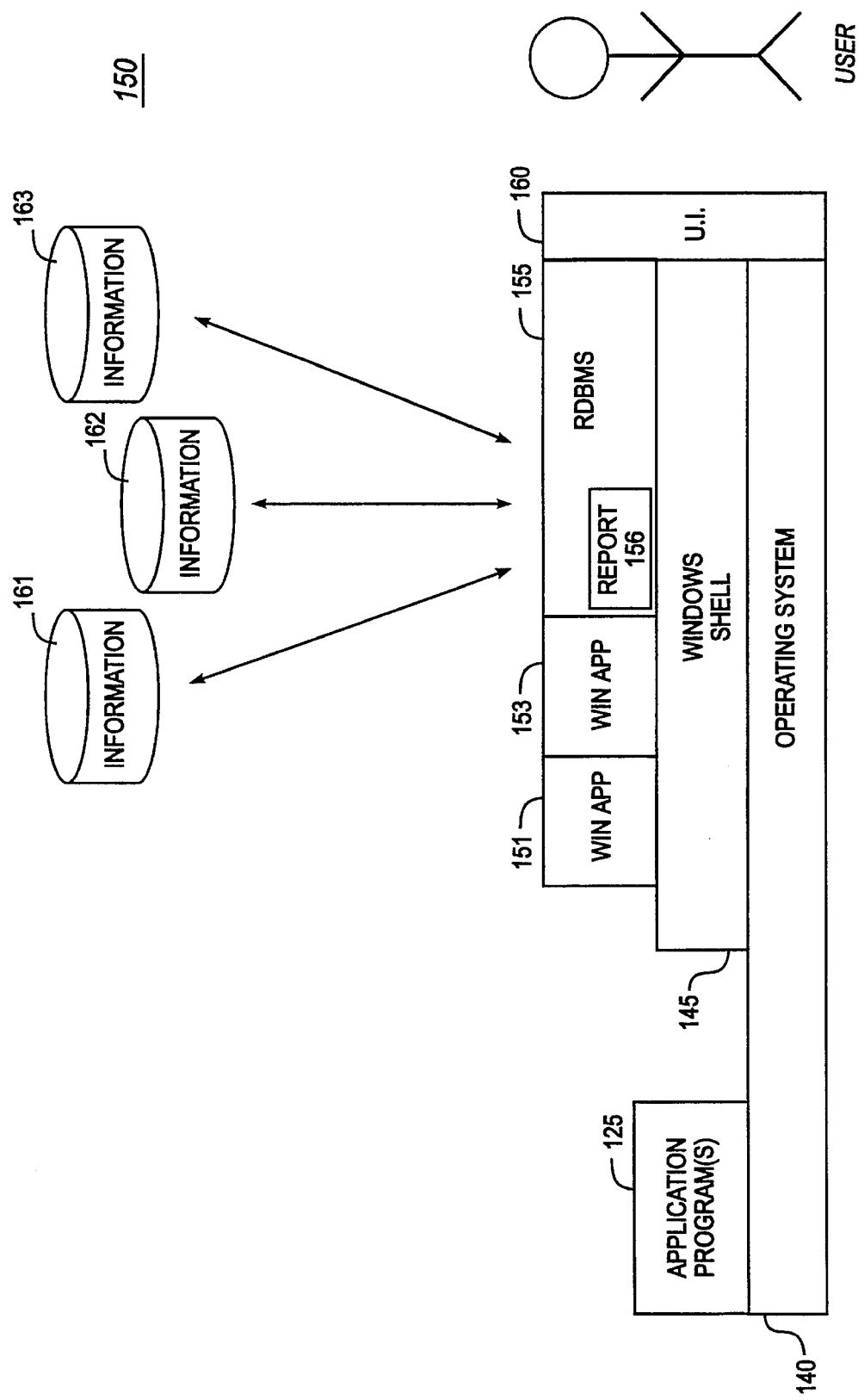
FIG. 1B is a block diagram of a software system of the present invention, which includes operating system, application software, relational database management system, and user interface components.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140. In a preferred embodiment, OS 140 is MS-DOS and windows 145 is Microsoft®Windows; both are available from Microsoft Corporation of Redmond, Wash. RDBMS 155 includes Paradox® for Windows Database Management System, available from Borland International of Scotts Valley, Calif.

The system 150 also includes a Report module 156 of the present invention for aiding users in the task of creating and displaying reports in a relational system. As shown, the module 156 is typically embodied within RDBMS 155. Before undertaking a detailed description of the construction and operation of the Report module 156 itself, however, it is helpful to first examine the general construction of RDBMS 155 and the preferred interface employed in its operation.

B. Relational Database Management System

RDBMS 155 is a system that controls the organization, storage, and retrieval of information from a database. A database is an organized collection of related information or data stored for easy, efficient use. An address book is a database, as is the card catalog in a library, a company's general ledger, and a completed tax form. Thus, a database is a collection of one or more tables used to keep track of information, such as the information 161, 162, 163 of system 150.

1. Tables

In a relational database management system, information is represented in tables. As conceptually shown in FIG. 1C, a table 170 is organized (logically) into horizontal rows (tuples) 173 and vertical columns 175, thus making it easy for a user to examine or change data. Each row or "record" contains all available information about a particular item, such as storing information about an individual person, place, or thing (depending on what the table tracks). A record for an employee, for instance, may include information about the employee's ID Number, Last Name and First Initial, Position, Date Hired, Social Security Number, and Salary. Thus, a typical record includes several categories of information, that is, each record in the table is made up of several categories of information about one specific thing.

Although a database record includes information which is most conveniently represented as a single unit, the record itself includes one or more columns or categories of information. A vertical column contains one category of the data or "field" that makes up a record. Each field contains one category of information about the person, place, or thing described in the record. In the employee table, categories include ID Number, Last Name and First Initial, Position, Date Hired, Social Security Number, Salary, and so on.

Each field has a field type specifying what sort of information the field can hold and what actions can be performed with that field's data. The system categorizes fields into several types. Each field's type determines the kind of data it contains. Some common field types include alphanumeric (or character), number, date, currency, and memo. System tables also support binary large objects fields, which hold specialized information, such as formatted memos, graphic images, and OLE links.

Internally, tables may be stored by the system as a sequence of fixed-length or variable-length binary records in a single disk file. The system uses a record number as an internal counter to keep track of each record. Between the actual physical database itself (i.e., the data actually stored on a storage device) and the users of the system, therefore, a database management system or DBMS provides a software cushion or layer. Because the DBMS shields the database user from knowing or even caring about underlying hardware-level details, the system manages record numbers automatically, with precautions taken so a user cannot change them directly. Thus, all requests from users for access to the data, including requests to retrieve, add, or remove information from files, are processed by the RDBMS without the user's knowledge of underlying system implementation.

2. Keys

As previously described, every relation (i.e., table) requires a unique, primary key to identify table entries or rows. Thus, a primary key (or just "key") is a field containing data that uniquely identifies each record of a table. In addition to creating a key on just a single field (e.g., key on Last Name), a user may create a "composite key" for a group of fields (e.g., key on Last Name +First Name). Whether a simple or composite key is employed, a key requires a unique value for each record (row) of a table to ensure that a table does not have duplicate records.

Often for a given table, it is possible that another set of fields in a table could have been employed as the primary key. All column combinations with unique values form a pool of "candidate keys," from which one is selected as the primary key. The rest remain alternate keys. In SQL and some other databases, candidate keys are generally recognizable because a "unique" index is likely to have been declared upon them. They can (at least in theory) be declared without necessarily having an index. Also, a unique index does not necessarily imply a candidate key; the fields could be only occasionally used and, hence, not valuable as identifiers for the entire table.

A table that has a key defined is said to be a "keyed" table. A table's key establishes the default sort order for the table. The system sorts the table's records based on the values in the field(s) the user defines as the table's key. This makes it easy for the system to find and process records quickly and to preserve the discipline required for a relational table (by not allowing records with duplicate values in the key). In a preferred embodiment, keyed tables are supported internally through use of indexes, which will now be described.

3. Indexes (a) General

By employing one or more database indexes, the records of a table can be organized in many different ways, depending on a particular user's needs. When a user requests an index, the system creates a file that contains the indexed field's values and their corresponding locations. The system refers to the index file when locating and displaying the records in a table. One can use an index to view the records in a different order from the default order. However, the records remain stored in the same physical location as they were entered.

Figure 1C:
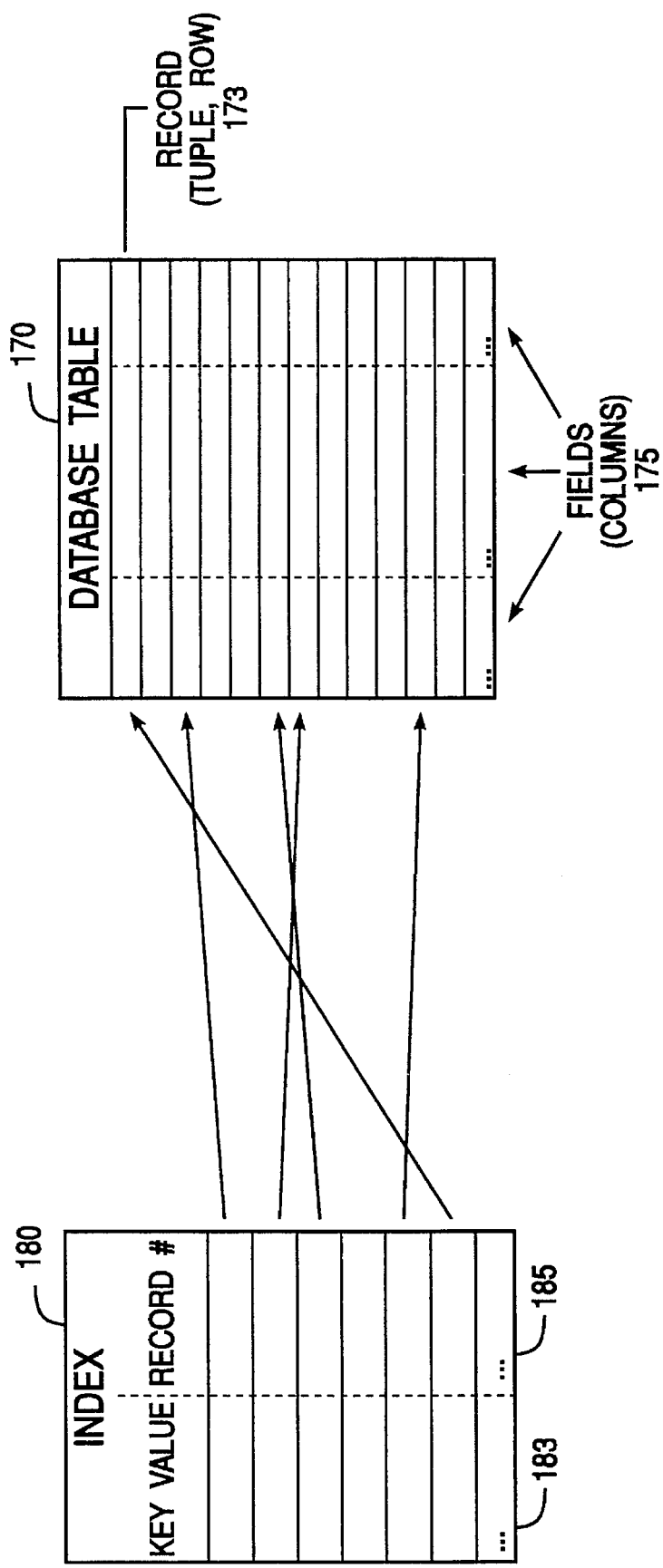
FIG. 1C is a diagram illustrating the conceptual relation between a database table and its index.

As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searching (querying) for and sorting of information.

(b) Primary Index (key)

The system organizes the records of a keyed table according to the values in the field(s) of the table's key. This is its primary index. By default, all indexes organize and access data in ascending order (A to Z or 0 to 9); a different order may be specified by the user if desired. By requesting an index based on a Last Name field of a table, for instance, the user is instructing the system to organize the table by the values in the Last Name field, that is, an alphabetic sort by Last Name. If, on the other hand, the user prefers to organize the table by first names, he or she can make First Name the primary index, whereupon the system displays the records according to the value in that field. For a composite key, the system organizes the records by the first field of the key (according to the table's structure), then the next field, and so on.

(c) Secondary Indexes

In addition to specifying a primary index or key for a table, the system of the present invention permits the user to specify one or more "secondary indexes" to define alternate view orders for the table. For example, if the user sometimes wants to view a table by First Name values, but needs to keep the table's key order (e.g., Last Name) intact, he or she can create a secondary index on First Name and use it to temporarily change the view order of the records. When the user views a table using a secondary index, the physical location of the records in the table does not change. Secondary indexes can also be used in linking database tables (as described below).

In a preferred embodiment, secondary indexes can be either automatically maintained or non-maintained. (Primary indexes are always maintained.) When the index is maintained, the system updates the index file whenever the user updates the table. A non-maintained index is not automatically updated when the user updates the table, but the user can open a non-maintained index for use on a table. As in the case of composite primary index, the user can create a secondary index on a group of fields, that is, a composite secondary index. In this manner, the secondary index organizes the data by the first field of the index first, then by the second, and so forth.

4. Referential integrity

If data is to be relied upon for decision-making purposes, data integrity should be assured. Of particular interest to the present invention is referential integrity, which assures that a field or group of fields in one table (called the "child" or "detail" table) matches the values in the key of another table (called the "parent" or "master" table). The value found in the child table that matches the key of the parent table is called the foreign key.

Referential integrity provides the user with a way of handling changing values in the parent table that affect the foreign keys in all its child tables. Suppose, for instance, that the user has an Orders table with a Customer No field. The user wants to be very sure the value he or she enters in that field represents a customer who can be found (and billed) in his or her Customer table. To ensure this, Customer No in Orders is defined as a foreign key pointing to Customer. Then, each time the user enters a value in the Customer No field of Orders, the system checks the Customer No field of Customer to make sure the entry is valid.

The system also provides for cascading updates. Suppose the user needs to change a value in a parent table's key. Referential integrity gives the user a way to make the same change in all matching foreign key records of the child table. Using the example of Customer and Orders, suppose the user changes the Customer No value of a record in Customer. Unless one uses referential integrity, all records in the child table (Orders) that belonged to the parent record become orphaned—they are no longer associated with a valid record in Customer. Using referential integrity, the system can cascade the change from Customer to Orders. The system finds all records in Orders that match the changed value in Customer's key and changes them to the new value.

C. Graphical User (Windowing) Interface

1. System UI

Figure 2:
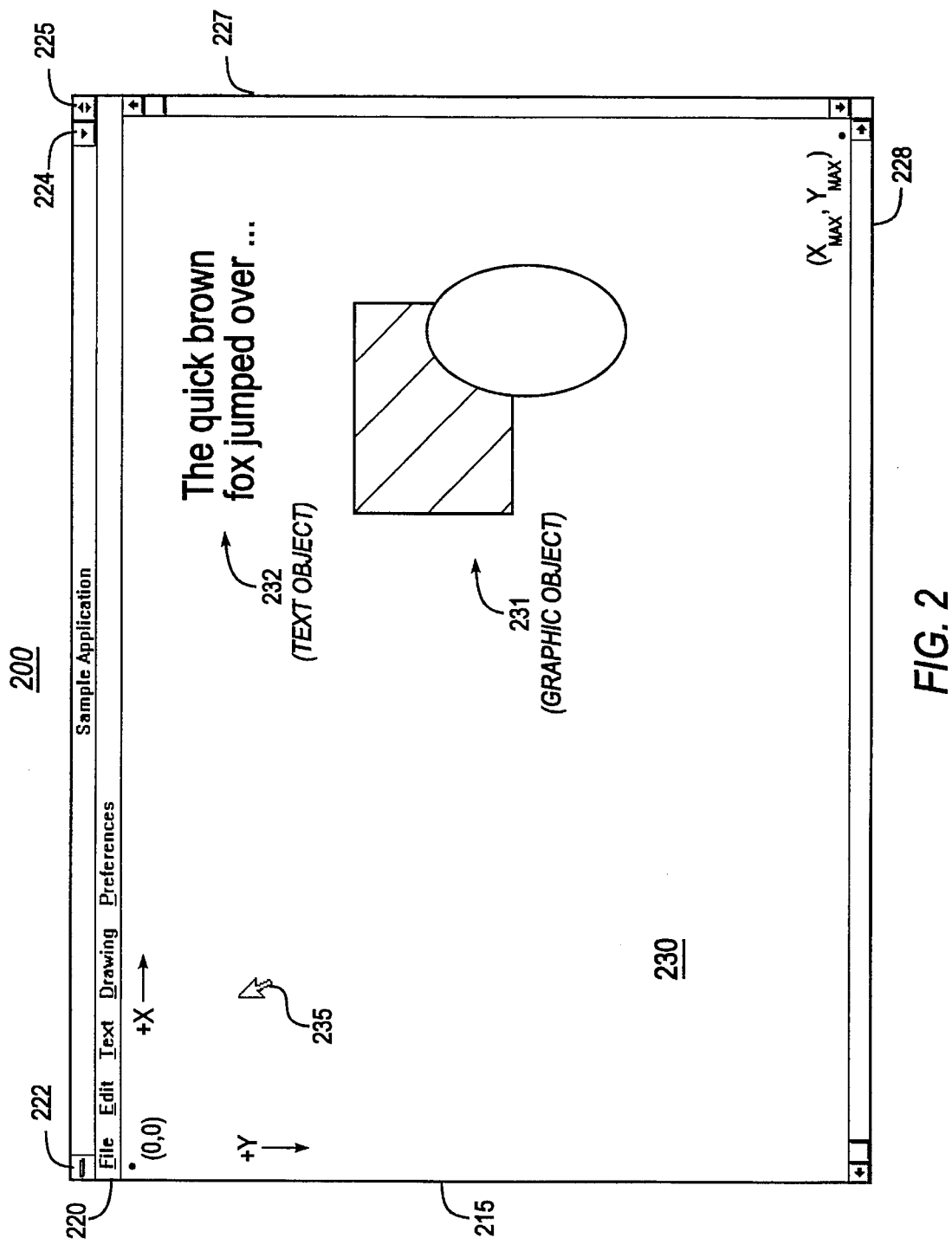
FIG. 2 is a bitmap screenshot illustrating the basic architecture and functionality of a graphical user interface in which the present invention may be embodied.

As shown in FIG. 2, the system 100 typically presents User Interface (UI) 160 as a windowing interface or workspace 200. Windows interface 200 includes a rectangular, graphical user interface (GUI) window 215 for display on screen 106; additional windowing elements may be displayed in various sizes and formats (e.g., tiled or cascaded), as desired. At the top of window 200 is a menu bar 220 with a plurality of user-command choices, each of which may invoke additional submenus and software tools for use with application objects. Window 200 includes a client area 230 for displaying and manipulating screen objects, such as graphic object 231 and text object 232. In essence, the client area is a workspace or viewport for the user to interact with data objects which reside within the computer system 100.

Windowing interface 200 includes a screen cursor or pointer 235 for selecting and otherwise invoking screen objects of interest. In response to user movement signals from the pointing device 105, the cursor 235 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 200 may be closed, resized, or scrolled by "clicking on" (selecting) screen components 222, 224/5, and 227/8, respectively. Keystroke equivalents, including keyboard accelerators or "hot keys", are provided for performing these and other user operations through keyboard 104.

In a preferred embodiment, GUI 200 is embodied in a message-based windowing environment. The general methodology for creating windowing interfaces and for retrieving and dispatching messages in an event-based GUI system, such as Microsoft Windows, is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference, Vols.* 1 *and* 2, *and* 3) *Tools,* all available from Microsoft Corp. of Redmond, Wash. The disclosures of each of the foregoing are hereby incorporated by reference.

2. Desktop UI

Figure 3A:
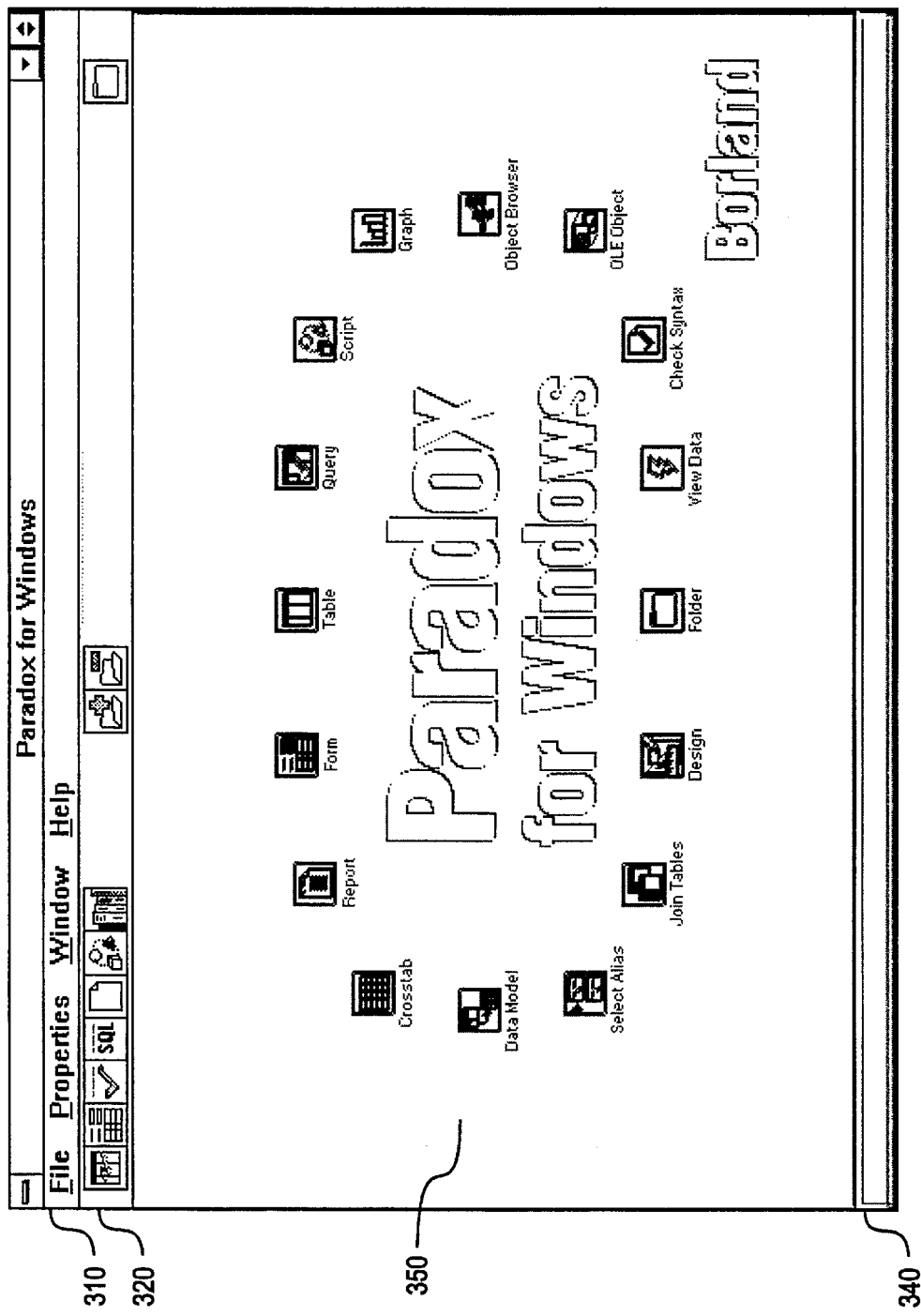
FIG. 3A is a bitmap screenshot illustrating a preferred Desktop or application interface for the system of the present invention.

In addition to the general windowing interface 200 for system 100, a preferred application interface is provided for RDBMS 155. When one starts the RDBMS system, a Desktop interface 300 first appears in display 106, as shown in FIG. 3A. The Desktop is the central working area in the system and serves as a "parent" window to all windows that appear in the system. It is where the user initiates all tasks. All windows are opened on the Desktop and are contained by the Desktop. Using the Desktop, the user can create and modify objects, set preferences, open and close files, and the like.

The Desktop may be divided into functional regions which include a main menu 310, a toolbar 320, a client area 350, and a status line 340. The menu bar 310 contains commands the user can choose to open windows, configure his or her Desktop, and work with his or her data. The menu bar is context sensitive, that is, it contains only the menus one needs at the moment. If a menu is not appropriate for a given task, it does not appear on the menu bar.

Figure 3B:
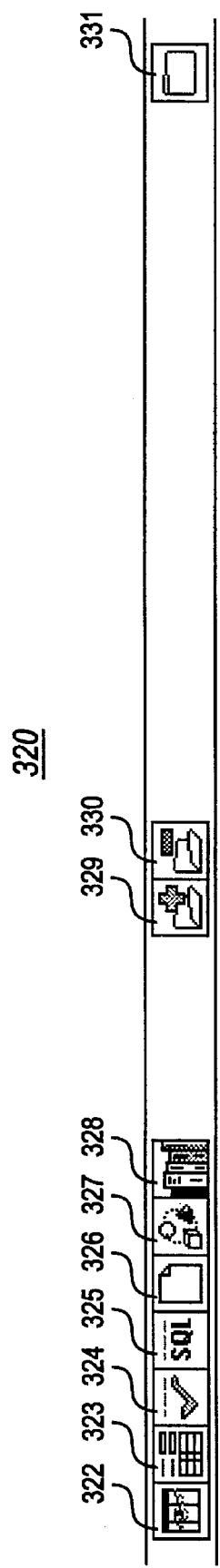
FIG. 3B is an enlarged view of a toolbar from the interface of FIG. 3A.

The toolbar 320 contains shortcut buttons for common menu commands. The toolbar 320, shown in further detail in FIG. 3B, comprises a row or palette of tools which provide a quick way for the user to choose commonly-used menu commands or properties. Like the menu bar, the toolbar buttons change as different windows are opened. To choose a toolbar button, one selects (clicks) it with the mouse. In an exemplary embodiment, the Desktop toolbar 320 includes Open Table 322, Open Form 323, Open Query 324, SQL Connection 325, Open Script 326, Open Report 327, Open Library 328, Add Folder Item 329, Remove Folder Item 330, and Open Folder 331 tools. The same actions are also available as corresponding commands in menus (available from menu bar 210).

The status bar 340 gives a user information about the task he or she is working on and the current state of the system. Like the menu bar and the toolbar, the appearance of the status bar changes as one works. As with the interface 200, standard Windows controls, like the title bar, the borders, the Control menu, the Maximize button, and the Minimize button are provided to let a user control the 5 shape, size, and position of the Desktop.

Desktop 300 includes a client area 350, which functions in a fashion similar to that for the above-described Windows interface 200 (in FIG. 1C) for displaying and manipulating screen objects of interest. In addition to simple text and graphic objects, the system provides the user with a set of sophisticated objects for storing and presenting his or her data. These will now be described in turn.

3. System Objects

(a) Tables and Design Documents

Figure 3C:
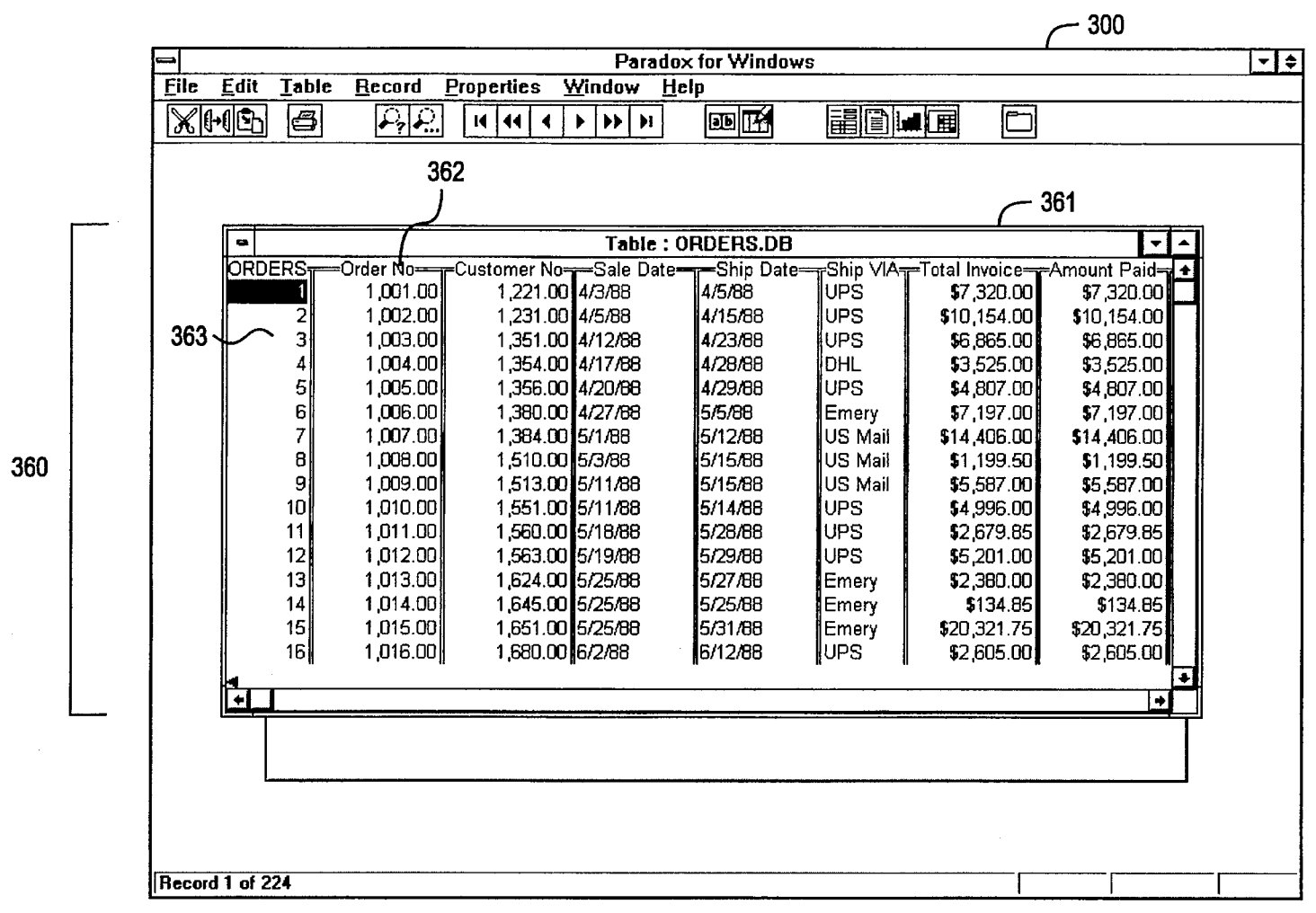
Figure 3D:
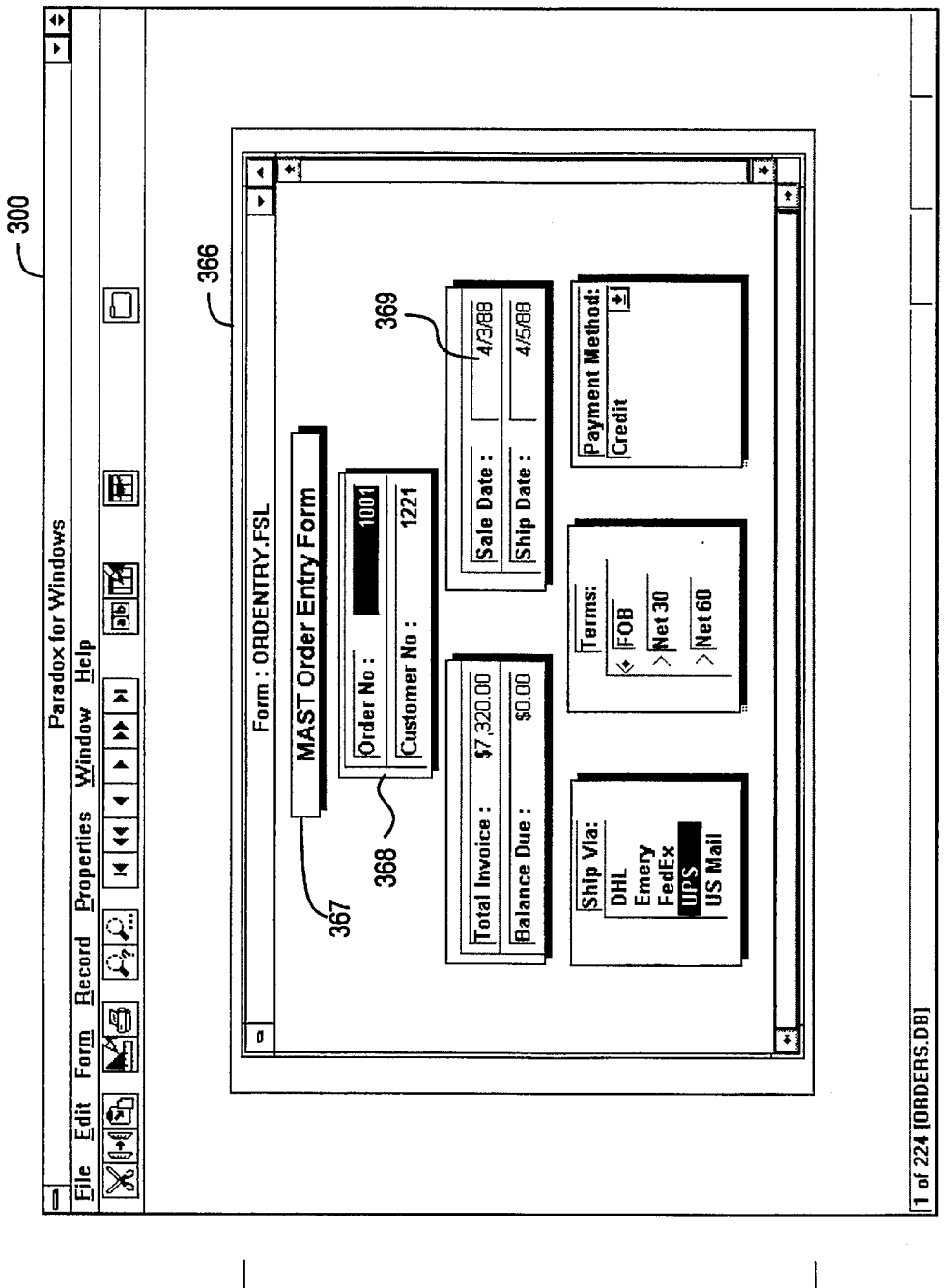
Figure 3E:
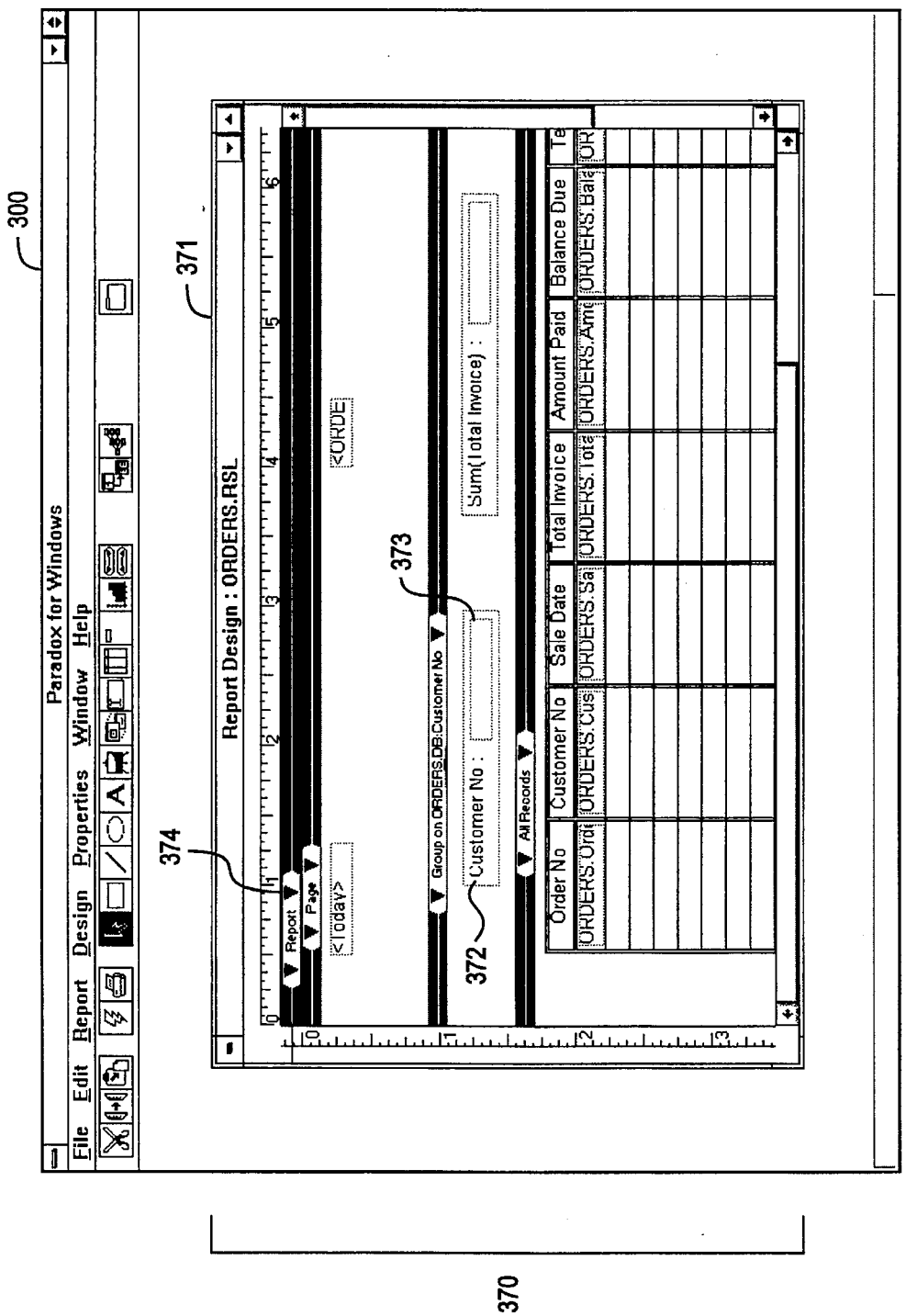

The system provides a set of objects including table, form, report, query, script, and library objects. As shown in FIGS. 3C–E, each type of major object in the system appears in its own type of window within the client area 350 and is itself comprised of objects. Table 361, for example, appears in a Table window 360; it comprises row and column objects 362, 363. Form 366 appears in a Form window 365 and includes (among other objects) an edit field object 369, a box object 368, and a text object 367. Similarly, Report 371 appears in a Report window 370 and includes, for instance, a report band object 374, a field object 372, and an edit field 373 (contained within the object 372). Each type of window includes specialized commands and functions that apply only to that type.

The Desktop 300 contains all windows; here, the commands and functions of the Desktop remain available to all the objects. Once one learns to work with one type of object, he or she can work with similar objects. For example, when the user knows how to edit tables using Table windows, he or she can also edit tables using Form windows. When one knows how to design forms, he or she has the basics of designing reports.

While tables (e.g., Table 361) are the objects that users will use the most in the system, users will often want to display information in a format which is not tabular. For this purpose, the system provides "design document" objects. Form 366 and Report 371 are design documents for instance. Each allows the user to customize how the user's data are presented.

The system of the present invention provides forms and reports as design documents that can present a user's data in a variety of formats. For instance, a user can create design documents that display one record at a time, display multiple records at a time, display only certain fields of a table, display design features (e.g., lines, boxes, graphic images, shading, or special color), and the like. Design documents can also link together different tables, so that information stored in separate tables appears to the user to come from one place.

Forms and reports differ as follows. Forms are editing tools which let the user display and edit data in his or her tables. The user can, for example, create forms that add data to several tables at once. Reports, on the other hand, are printing tools. They allow the user to format and print his or her data. A user can, for example, use reports to create form letters, mailing labels, invoices, and the like. Unlike forms, reports cannot change the data in a user's table (though they can change the way his or her data appears on a final report).

To create a new design document, the user proceeds as follows. First, the user opens a design window for the type of document desired. For a form object, for instance, the user would open a form window (e.g., Form Window 362). Next, the user places the objects he or she needs on the document. Finally, the user changes the property of the objects on the document until they appear as desired.

Underlying the design document is one or more tables that contains the data which the user wishes displayed on screen or printed in a report. Thus, the task of creating a design document is one of choosing the table (or tables) that contains the data desired; defining the relationships between tables (in the instance of a multitable design document), specifying the fields desired to be displayed in the design; and choosing an initial design layout for the document. This task is simplified by use of a data modeling module which is described in U.S. application Ser. No. 08/067,202, commonly owned by the present assignee.

(b) Creating tables

Figure 3F:
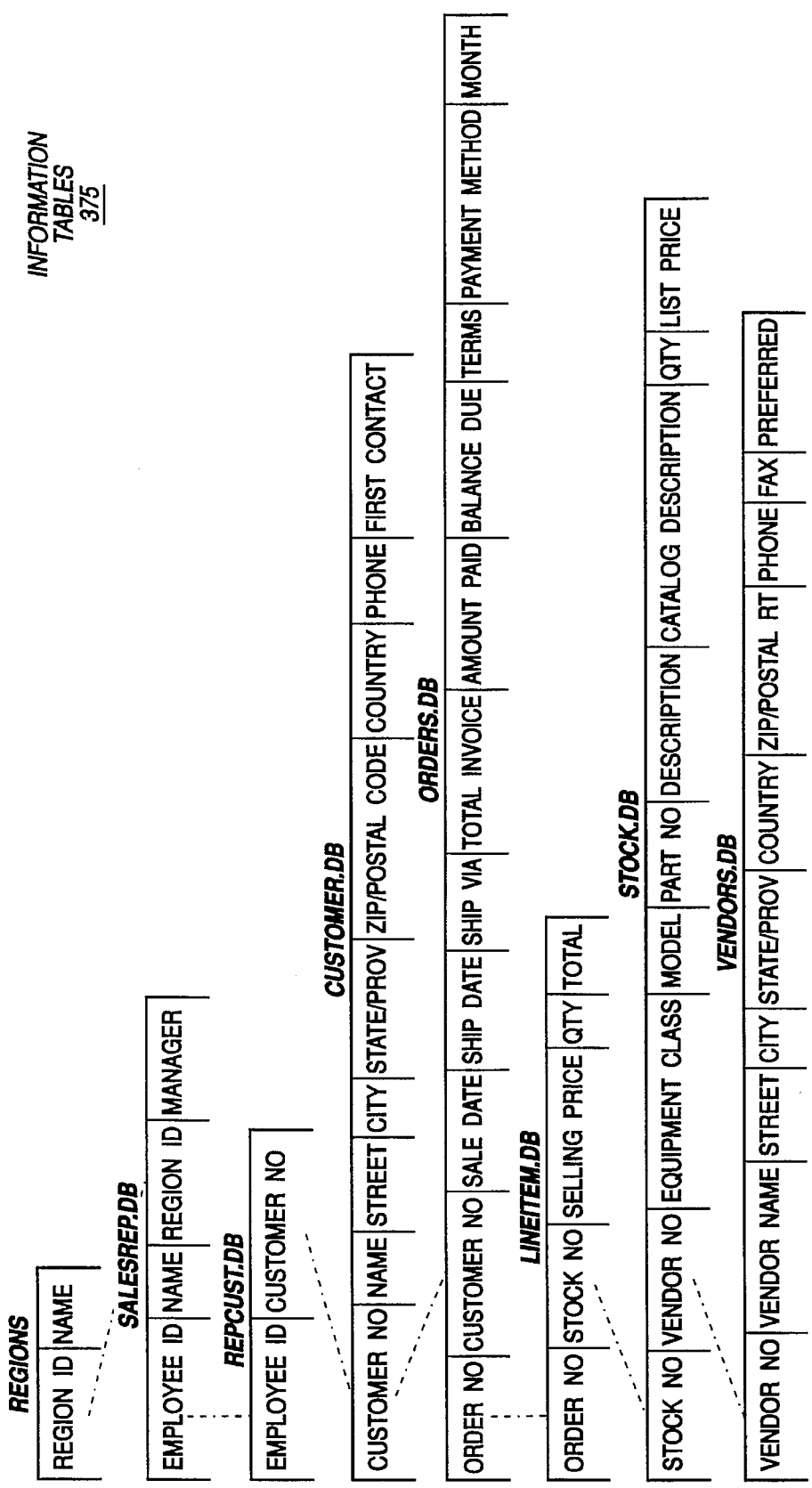
FIG. 3F is a block diagram of a sample database system for tracking sales orders.

The creation of information tables and design documents will be illustrated for a small sales order-management database, which is sophisticated enough to demonstrate the elements of creating a relational model, but is sufficiently simple for clarity. The database includes a plurality of information tables 375 as shown in FIG. 3F. It includes a Customer table (CUSTOMER.DB) for storing customer data, and includes an Orders table (ORDERS.DB) for storing information about each order made by a customer. As shown, each of these two tables includes a common field: Customer No. The two tables may, therefore, be linked through this common field. Moreover, to maintain integrity of the Orders table, no order should be accepted for a customer which does not exist; in other words, the Orders table is preferably dependant on the Customer table (in a child-to-parent or detail-to-master relation).

Just as the Orders table may depend from the Customer table, the Orders table itself may have several tables depend from it. Thus, as shown in FIG. 3F, the database also includes a Line Item table (LINEITEM.DB), a Stock table (STOCK.DB), and a Vendors table (VENDORS.DB). The Line Item table serves to store each line of information of each order; thus, each entry in the Line Item table references the Orders table through a common field, the Order No. Each entry in the Line Item table includes a Stock No, thus referencing an entry in the Stock table. Each entry in the Stock table includes a Vendor No, for referencing a particular entry in the Vendors table.

Figure 3G:
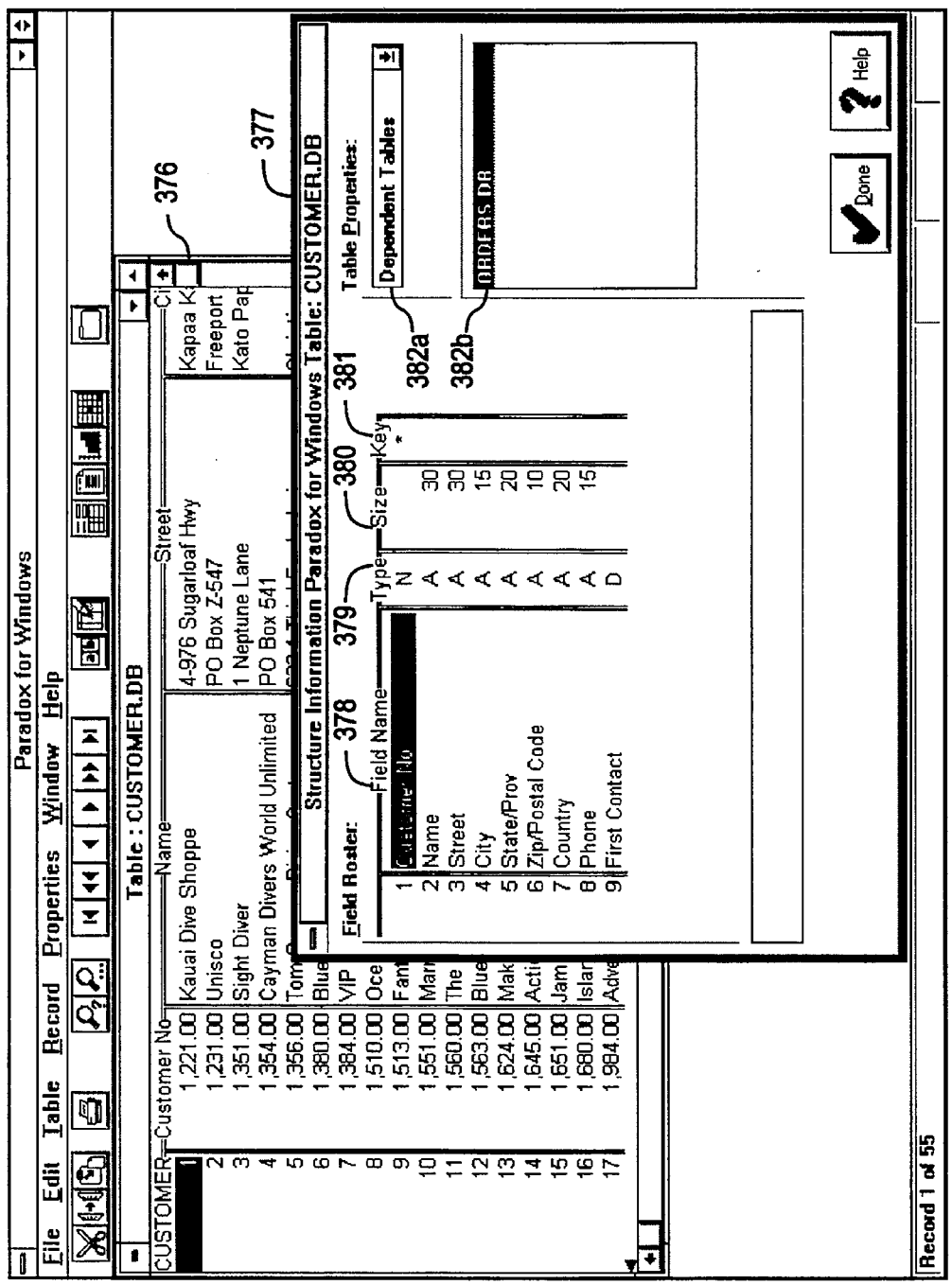
FIGS. 3G–K are bitmap screenshots illustrating the structuring of information tables for the system of FIG. 3F.

To create these tables, the user specifies a structure for each. The structure includes information about the name of each field, its type, and its size (if necessary). As shown for the Customer table 376 of FIG. 3G, for instance, the table has been defined with a structure as shown by the structure information dialog 377. Each field has been given a field name 378, a type 379, and a size 380 (if necessary). In addition, the user may select one or more fields to serve as a key 381 (or no fields in the instance of an unkeyed table). Also shown, the dialog 377 includes a table properties list 382a. With the property list set to show dependent tables, a display list 382b indicates that the Orders table is dependent upon the Customer table (as will be described in further detail).

Figure 3H:
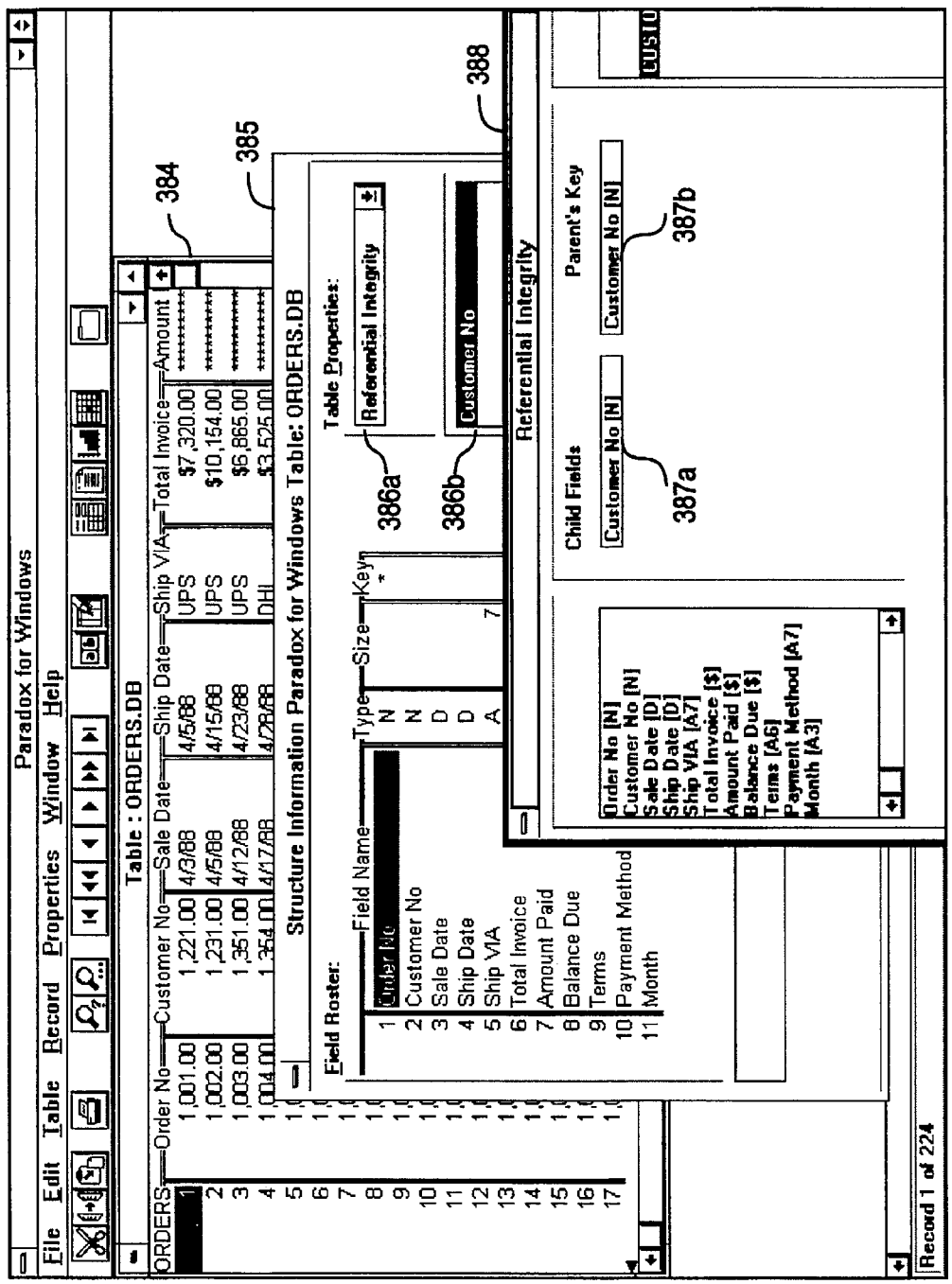

The structure for the Orders table 384 is shown in structure information dialog 385 of FIG. 3H. As before, appropriate information has been entered for field name, type, and size. Also shown, the table has been keyed by Order No. From the table properties list 386a, the user has specified a referential integrity check for the Customer No field (which now appears also in the list 386b). In response to the request, the system displays a referential integrity dialog 388. As shown by the child fields list 387a, the user has selected the Customer No field from the Orders table 384 to match a parent's key of Customer No (shown in a parent's key list 387b), thus linking the Orders table 384 to the Customer table 376.

Figure 3I:
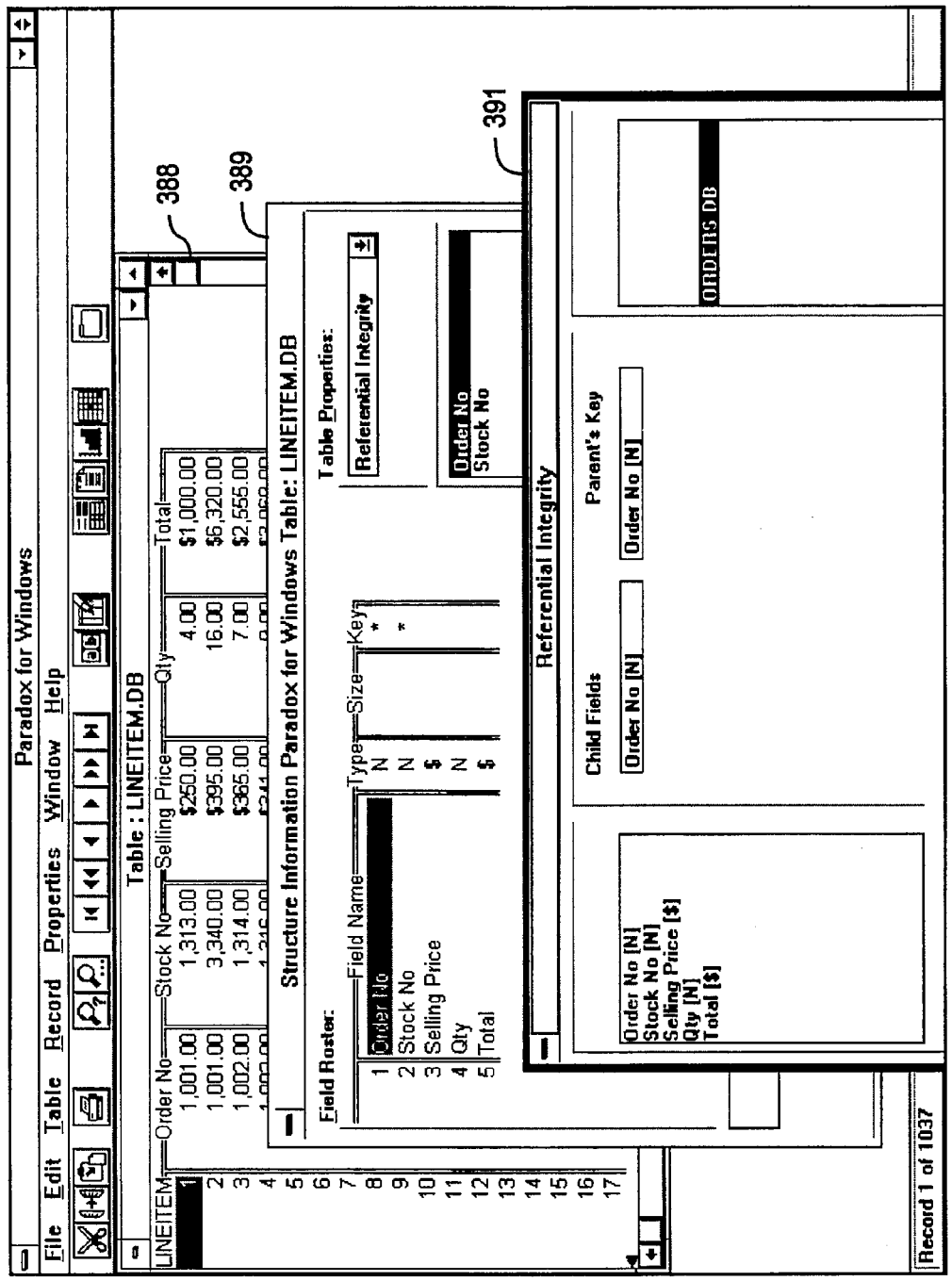
Figure 3J:
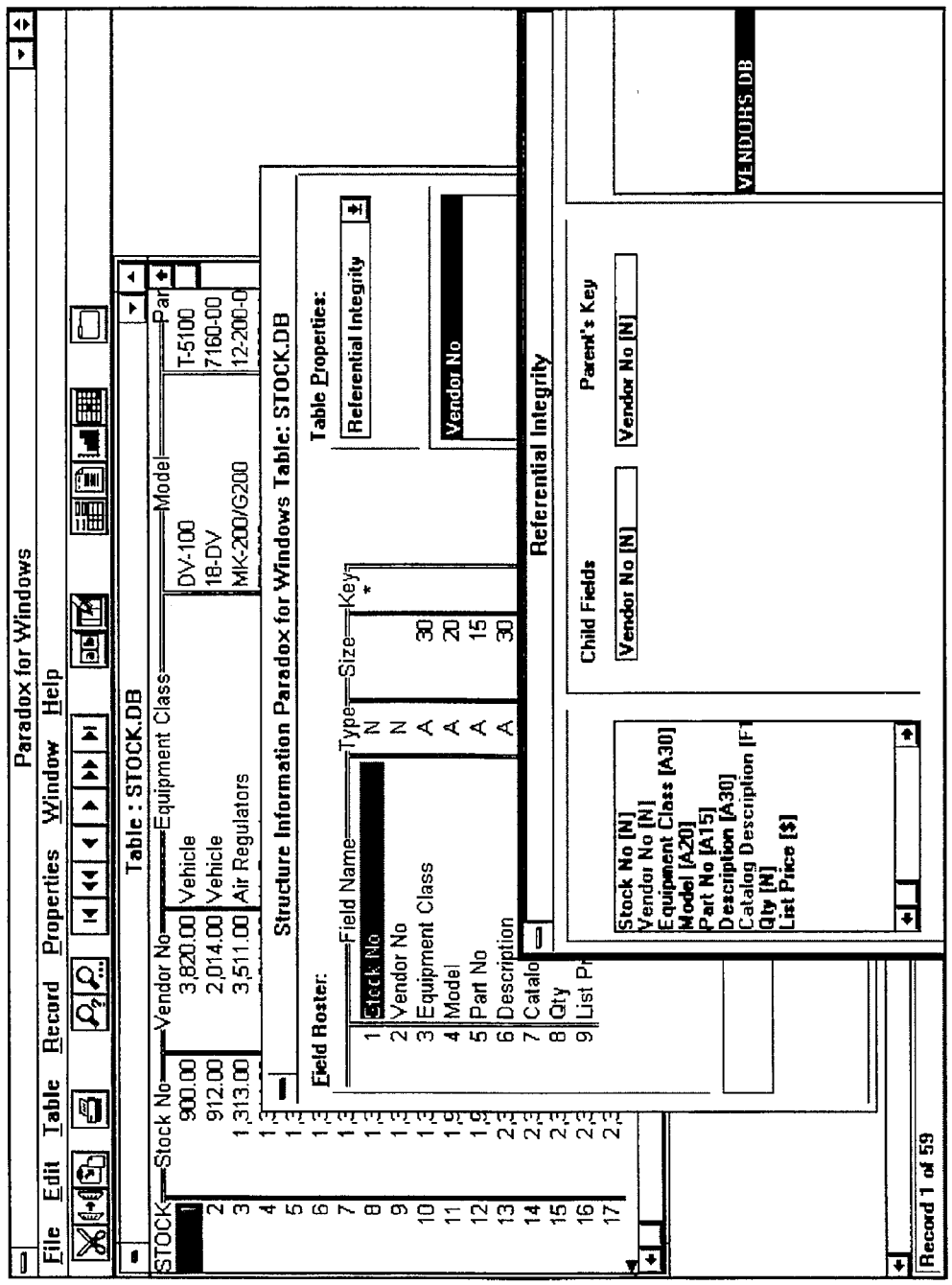
Figure 3K:
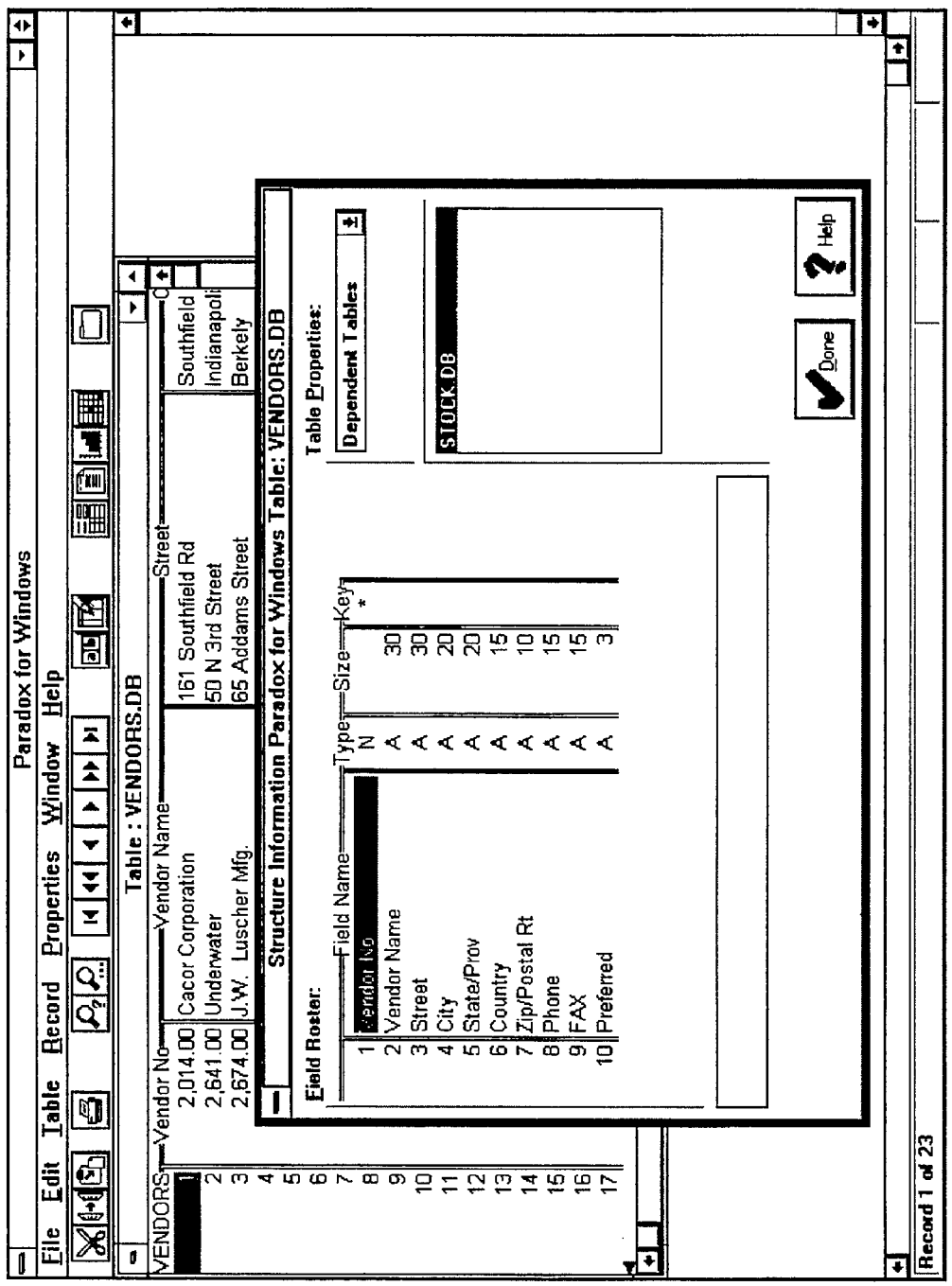

As shown in FIGS. 3I–K, Line Item, Stock, and Vendors tables are structured in a like manner. Line Item table 388 includes a structure as shown in dialog 389, with referential integrity checks defined on its Order No and Stock No fields (e.g., the Order No field is linked to the Orders table as shown in the referential integrity dialog 391). Structures for the Stock and Vendors tables are shown in FIGS. 3J and 3K, respectively.

Hypertext Report Writing

A. Hypertext Documents

Before describing operation of the hypertext reporting module 156 in detail, it is helpful to review the general nature of hypertext documents. The basic idea of hypertext is simple: related information is linked together, regardless of its location and medium. Links may lead to other links, and so on, to form a nearly endless chain of information. Since the user may easily traverse the information through one of many desired paths, hypertext documents are interactive, automatically taking the user to the exact information desired regardless of the format or application.

From the perspective of a hypertext author, a hypertext document includes connections or links between ideas, thus giving information a structure (or many potential structures). Hidden control codes embedded in the text by the author are used to designate selected text items, icons or other bit-mapped images, as "links" or "jumps." These links point to other sections of hypertext usually organized as "topics" or "pages" that can be displayed in any sequence at the discretion of the user. Links can also be set to point to small passages of text that, for instance, define the meaning of the word or phrase being linked. These smaller topics may be more effectively displayed in a temporary window rather than by jumping to a fresh screen.

From the perspective of the user or reader, hypertext documents can be read in the usual sequential manner, using page up, page down and similar cursor or scrollbar controls. However, the user also has the option of clicking on any link in order to switch (jump) to the page or topic associated with that link. The user can recognize those areas of the screen that offer a link in several ways. Typically, the link may be a portion of text of a distinct color or font, or the screen may display icons or bitmaps with suggestive images and legends. Further clues are often presented by changing the cursor shape whenever it moves within a link area.

Using highlighted links to indicate that related information is located somewhere else has obvious advantages. The user immediately knows when more information on a subject exists, without having to hunt through an index or do a search. At the same time, he or she can move to the information instantly, usually with a single mouse click. All the while, access is transparent—the user need not be concerned with underlying details of data access (e.g., what file the information is stored in). By hiding additional information for a given topic, hypertext documents allow readers to choose which topics need to be expanded into full detail, and which related topics need be followed.

In typical use, a user will jump from one screenful of data to another, with further links appearing in each new screen. With suitably prepared hypertext files, therefore, the user can navigate through a series of nested topics in any way desired. With the growing complexity and volatility of technological terminology, the traditional method of presenting information in a linear format is proving to be increasingly inadequate. The linear approach often forces the author to assume little or zero-knowledge on the part of the reader, so that each possibly new term requires an in-text, parenthetical or footnote detour for clarification. With hypertext, such amplifications and definitions can be moved to other pages accessible via links. Readers can follow or ignore these links according to their level of expertise. The same concept extends to each level of linked topic, permitting hypertext authors to present readable, uncluttered information for many classes of readers.

The first program to popularize hypertext was HyperCard, from Apple Computer. HyperCard allows Macintosh users to link information together using an index card metaphor. This way, non-programmer users can build applications using text-to-text linking provided by hypertext. Today, hypertext documents are commonplace. Most users are familiar with the hypertext links in online help systems, such as WinHelp, the online help system for Microsoft Windows.

Figure 4A:
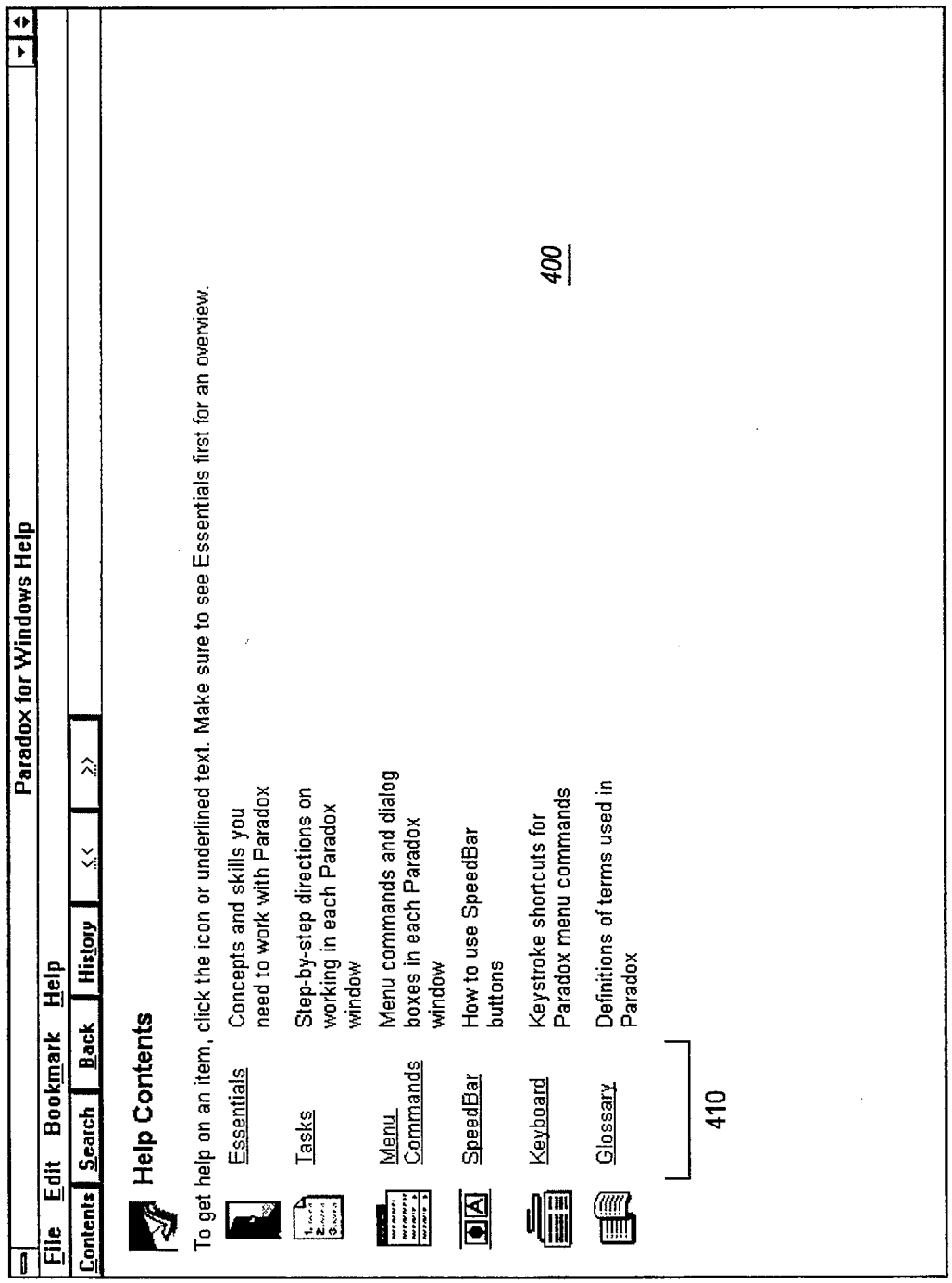
Figure 4D:
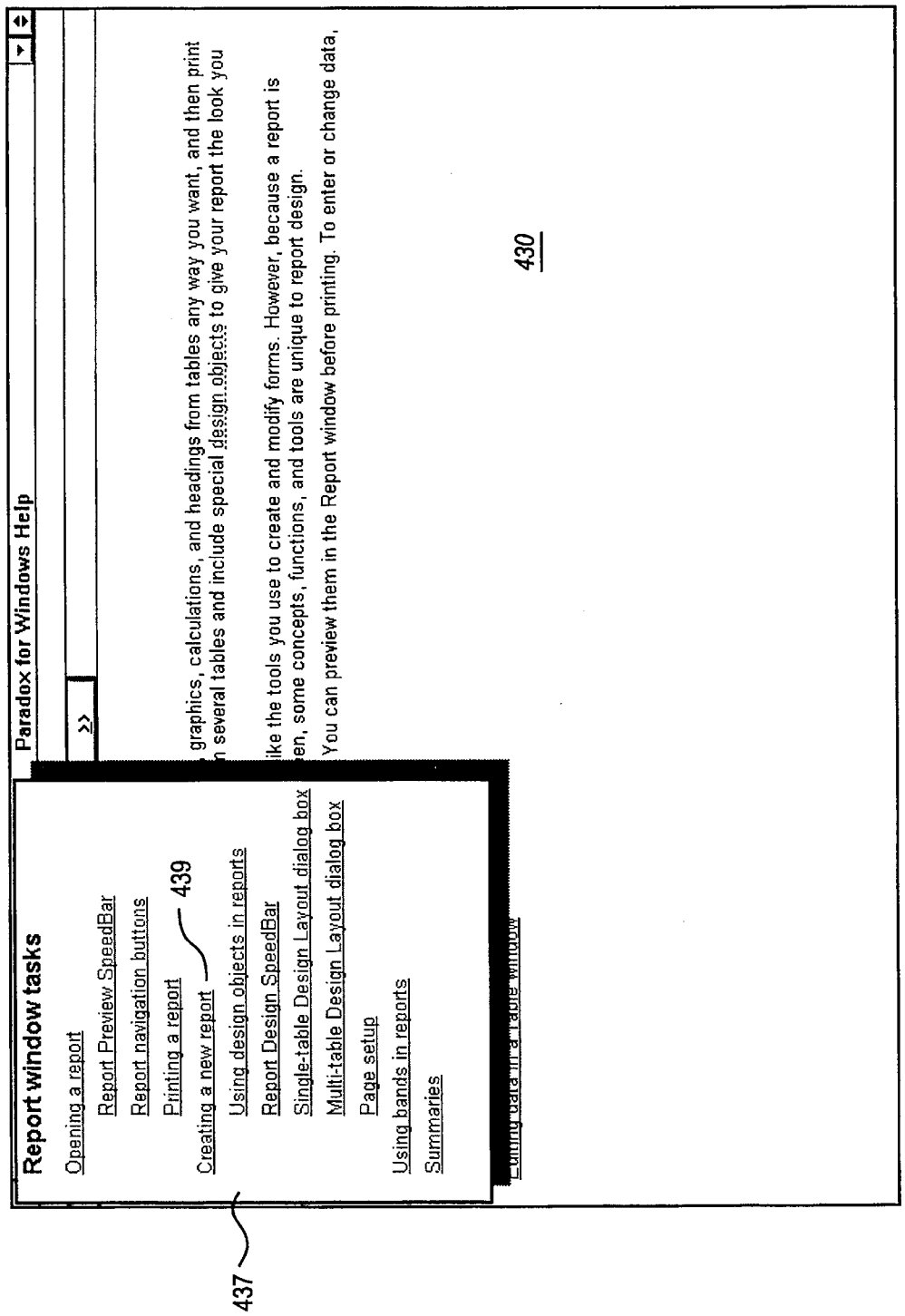

The following example demonstrates simple use of Microsoft Windows' WinHelp, which, in a preferred embodiment, is employed as the hypertext engine. Suppose that a user desires help with the task of generating a report in a database management system, such as in Borland's Paradox for Windows. Upon requesting help, the user is presented with the help screen 400, shown in FIG. 4A. Screen 400 displays a short topic list 410. Each topic, in turn, is highlighted (e.g., underlined and bold green letters). The user need only click the mouse pointer or press Enter on the phrase of interest to jump to desired information. For instance, since the user in this example wants to generate a report, he or she would select "Tasks" from the list 410. In response, the system displays help screen 420, shown in FIG. 4B; the screen displays information about common tasks for the application (i.e., Paradox for Windows). Included in this information are additional links, again indicated in highlight. For instance, at 425, the word "Report" is highlighted. By clicking on the word (or selecting the accompanying icon), the user can see additional information about designing and running reports. In response to the user selecting report 425, for instance, the system displays Reports screen 430.

In help screen 430, information specific to reports is displayed. Yet, the user may require additional detail. Thus, the user may continue in the same manner as before, selecting "jump" text to access more detailed information. Upon selecting "Report Window Tasks" 435, the system displays a Report Window Task popup menu 437. The user may select "Creating a New Report" jump text 439 for access to detailed information about creating a new report. Finally, the detailed help screen explaining creation of a new report—Creating a New Report 440—is shown in FIG. 4E. Thus, in the span of just four mouse clicks, the user has been able to quickly go from high level information (Help Contents 400) to very detailed information (Creating a New Report 440). In this fashion, the user does not read the online help manual "cover to cover," but instead browses relevant sections in a non-linear way.

Although hypertext is a boon for users of online help, it has never been a particularly easy task for authors to create such documents. The traditional preparation of hypertext files calls for specialist authors who not only compose the relevant pages or topics, but also plan a suitable linking strategy and embed the appropriate codes to achieve this linking. With Microsoft Windows' WinHelp, for instance, one must create two distinctively different types of files: (1) the Help project file and (2) help source files. The former is an ASCII text file which is divided into various sections which specify directives to a Microsoft Help compiler (HC.EXE). The latter is a script file containing the information of the hypertext document together with various links which the author has specified—that is, it specifies the actual help information and special codes that control indexing and appearance of the hypertext document. This script file, which is in Microsoft's RTF (Rich Text Format) is then "compiled" by the Microsoft Help compiler (HC.EXE) into a WinHelp hypertext document (.HLP file), which may be viewed using the runtime viewer or reader, WINHELP.EXE, which ships as a standard component of Microsoft Windows.

The format for specifying hypertext links in a WinHelp script file involves a particularly obscure Microsoft format, as shown by the following table.

| Control Code | Purpose |
| --- | --- |
| Asterisk (*) footnote | Build tag - Defines a tag that specifies topics that compiler conditionally builds into the system. Build tags are optional, but they must appear first in a topic when they are used. |
| Pound sign (#) | Context string - Defines a context string that uniquely identifies a topic. Because hypertext relies on links provided by context strings, topics without context strings can only be accessed using keywords or browse sequences. |
| Dollar sign ($) footnote | Title - Defines the title of a topic. Titles are optional. |
| Letter "K" footnote | Keyword - Defines a keyword the user uses to search for a topic. Keywords are optional. |
| Plus sign (+) footnote | Browse sequence number - Defines a sequence that determines the order in which the user can browse through topics. Browse sequences are optional. However, if you omit browse sequences, the Help window will still include the Browse buttons, but they will be grayed. |
| Strikethrough or double-underlined text | Cross-reference - Indicates the text the user can choose to jump to another topic. |
| Underlined text | Definition - Specifies that a temporary or "look-up" box be displayed when the user holds down the mouse button or Enter key. The box can include such information as the definition of a word or phrase, or a hint about a procedure. |

Figure 5A:
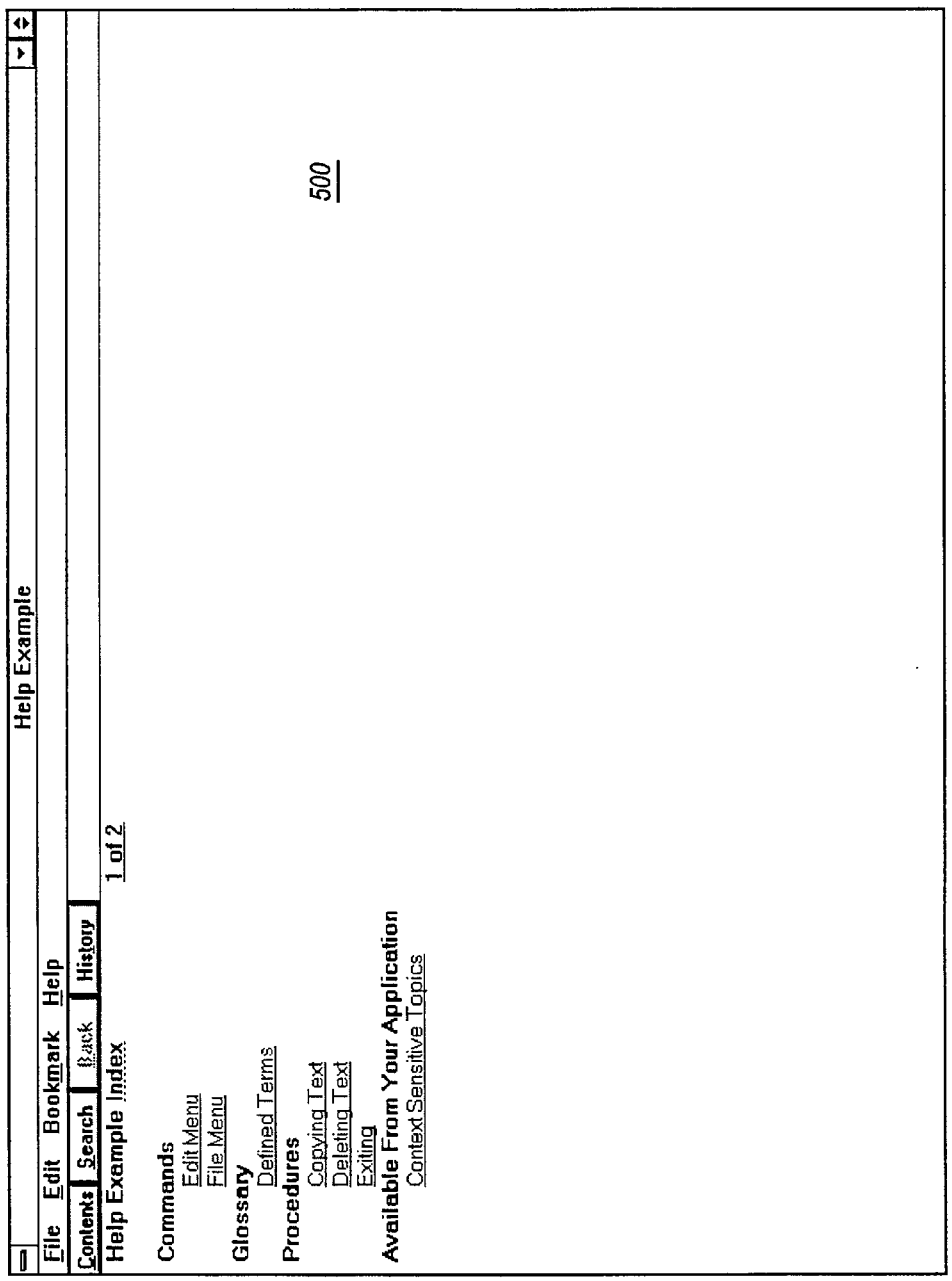
FIGS. 5A–B are bitmap screenshots illustrating creation of a simple hypertext document, for use with Microsoft Windows.
Figure 5B:
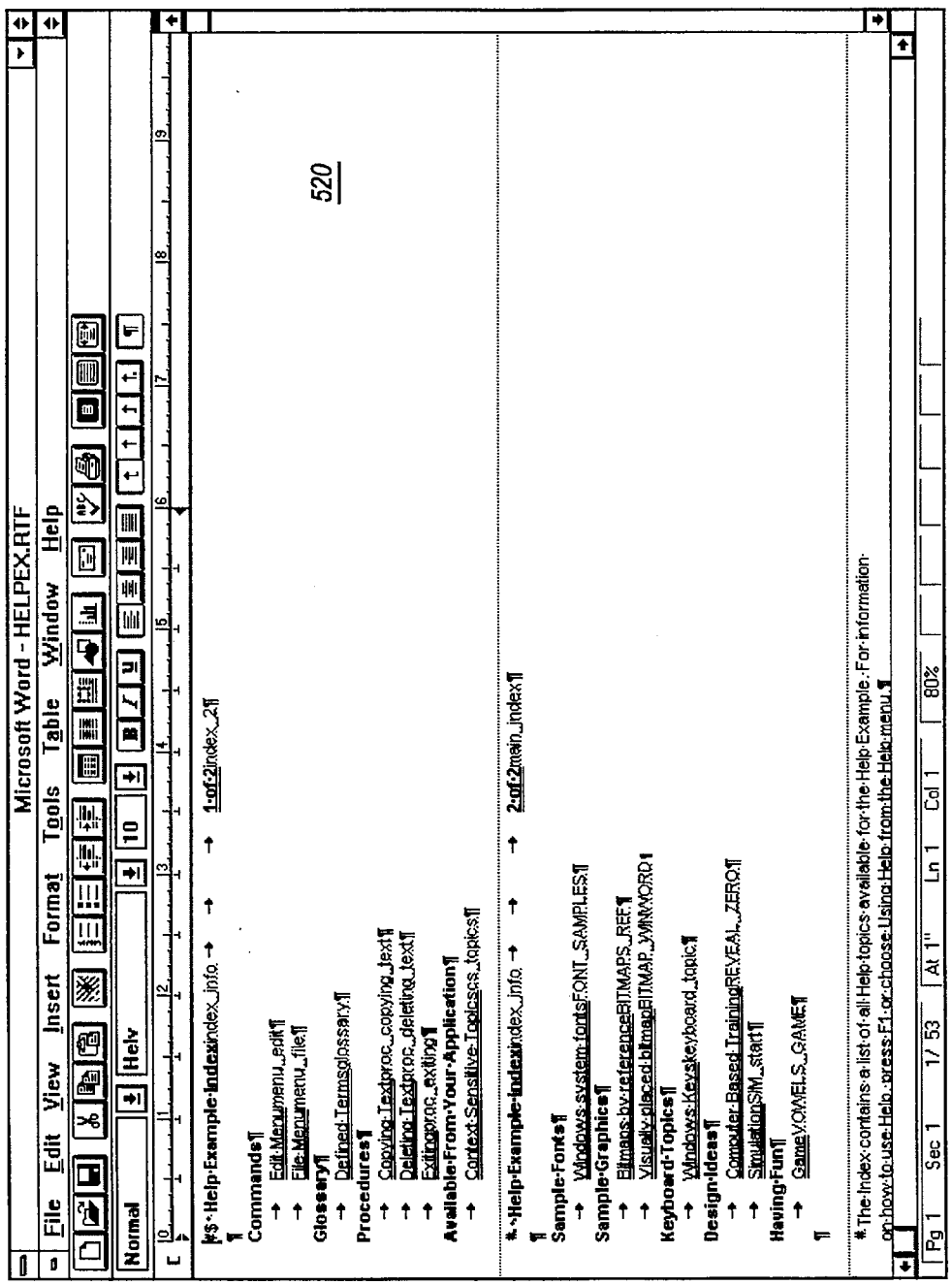

For the trivial hypertext help example 500, shown in FIG. 5A, the author must enter the RTF script 520, shown in an RTF-compatible editor (Microsoft Word) in FIG. 5B. As a result of this complex interface and environment, the ability to create hypertext documents, such as WinHelp's .HLP document, has remained beyond the reach of most end users.

Recently, various hypertext authoring tools have become available from various vendors. These tools seek to simplify the task of creating a hypertext document by providing a visual environment, one in which an author may specify a link using graphical user interface technique (e.g., "drag and drop"), thus shielding authors from Microsoft's awkward syntax. Regardless of how much the process is automated, however, one still must specify the links which are desired to connect various pieces of information. Thus, although some of the drudgery of creating a hypertext document has been eliminated, much effort is still required to specify various-links or connections in a document and how those connections are to be displayed to end users. As will be described below, the present invention simplifies this process by generating hypertext versions of database reports.

For further information on WinHelp, see: 1) Duncan, R., *Constructing Your Own Windows Help Files*, PC Magazine, Apr. 27, 1993, pp. 325–329; (2) Duncan, R., *Building the Basic Structure of a Windows Help File*, PC Magazine, May 11, 1993, pp. 349–354; 3) Duncan, R., Four *Techniques to Enhance Your Windows Help Files*, PC Magazine, Jun. 15, 1993, pp. 359–361; (4) Duncan, R., *Implementing Macros in Your Help Files*, PC Magazine, Jun. 29, 1993, pp. 326–329; (5) Duncan, R., *Integrating a Windows Help File Into an Application*, PC Magazine, May 25, 1993, pp. 343–354; and (6) Borland C++3.0 Tools & Utilities Guide, Chapter 7: HC: *The Windows Help Compiler*, Borland International, 1991, pp. 101–152. The disclosures of each of the foregoing are hereby incorporated by reference.

B. Adapting database reports to hypertext

1. Recognizing related information

Often there is a need to generate reports which are similar in information content—that is, they rely on the same underlying database tables. For instance, reports often contain the same information but at a different level of detail and, often, a different controlling order. Consider the example of a report which shows all the sales orders which a particular customer made (i.e., a report of orders ordered by customer). Such a report is ordered on customers, with the detail information being the order information itself. Consider, on the other hand, a report of how many customers ordered a particular part; that is, for each part the report lists all orders that relate to the part. The particular orders for each part generate a count of customers who actually placed an order for that part. Although this report might appear, to practitioners of the current state of the art, to be very different from the first report, the two reports nevertheless draw from the same information source (i.e., from the very same database tables).

Consider, as another example, a report which lists the sales by sales representative (i.e., employee). Such a report would include summary information which specifies how much a given sales representative sold. Also, summary information could be provided to list sales representatives for a given region. The overall structure for such a report is as follows. At the highest level, the report presents a directory of sales representatives. Each sales representative, in turn, is associated with a list of customers which that particular sales representative services. Finally, each customer would have a list of orders which that customer has placed. The information in the desired report, although it may come from different database tables, is nonetheless related.

In a conventional approach to creating such a report, all of the reports would be generated and printed individually. Then, the individual reports would be pasted together and placed in a booklet. Since each report is generated separately, information cannot be presented in ways which allow users to quickly locate detailed information of interest; there is no opportunity to hide uninteresting details. As will now be described, the present invention allows information which would typically be presented as different reports to be combined into a single hypertext report (or multiple reports with interreport hypertext crosslinks).

2. Establishing links between tables

When determining a link, the system favors a link via a unique key of one of the tables, typically the master table. A unique key may be a primary key, another candidate key, or other means which uniquely identifies a record (e.g., unique index). As the primary key is typically the key of most interest of the available candidate keys, it may be accorded highest preference. In the event that a link is not available via the primary key, however, the system may proceed to investigate other candidate keys or other unique indexes of the table (giving these preference over nonunique indexes) for linking. Exhaustion of possible links for one type of unique key (e.g., primary key) will preferably be followed by a similar inquiry for the other keys (e.g., next candidate key) according to the preferences of the implementor.

The Customer table of FIG. 3F includes a primary key on the Customer No field. Since a primary key is a unique identifier and usually the most preferred of available unique identifiers (e.g., other candidate keys), it is normally very good for linking one table to another. As shown for the primary key of the Customer table, the table can be linked to the Orders table) by an indexable field matching the primary key of the master table. Thus, a foreign key is available through the indexable field, which specifies a one-to-many relation (between customers and their orders).

If a foreign key relationship is not be explicitly defined (e.g., through the previously-described referential integrity), one may be nevertheless implied. Specifically, if a primary key of the master is found yet there is no existing foreign key relationship between the master and the detail tables, an indexable field of the detail table which supports the master's primary key may be located as follows. The system looks for an index (indexable field) of the detail which supports the key. To match, the field of the index must have the same (or compatible) data type as that of the primary key. In this manner, the system may determine fields between tables which support a link, including fields which share a common domain, that is, a common pool of values for one or more that have the same meaning. Thus, if no foreign key relationship were declared between the two tables, the system may still effect a link through corresponding Customer No fields of the tables.

3. Generating reports with hypertext links

Given a set of reports, the system of the present invention can identify that particular reports are similar in information—that is, they can be related to one another. Based on identification of relations (described above), the system of the present invention may place appropriate hypertext links from one report into the body of another, related report. Given the above-mentioned "Customers by Sales Representative" report, for instance, the system can determine that the primary order (sort order) is by representative, such as sort on Employee ID which serves as the primary key for the sales representative table. A foreign key relationship through Employee ID exists between the sales representative table and the customer table, thus allowing the sales representative table to be linked to the customer table. Moreover, the relationship is a one-to-many relationship, as each sales rep may have more than one customer. The "Orders by Customer" report, on the other hand, is ordered by Customer ID. Thus, for this report, the Customer table is linked to the Orders table in a one-to-many relationship, using the Customer ID as the foreign key.

Recognizing these relations, the system can automatically generate a "drill-down" report, using hypertext links. At the top or highest level summary information can be presented, such as a directory of sales representatives. The reader of the report may then drill-down into more detailed information, such as accessing a list of customers for a particular sales representative. From those customers, the user may, in turn, select a particular customer for drilling-down to order information for that customer. Each customer would include, in turn, a hyperlink or jump text derived from the report name "Orders by Customer" and the Customer ID. Upon the user selecting this jump text, the system would display a page of the report which lists orders for the customer (i.e., information of the second report). The jump goes to a topic marker, which is placed in the group header for the second report. This link may be established automatically by the system because there is a field in the customer table (Customer ID) that can be linked to the Customer ID field of the second table, Orders. With drill-down reporting, therefore, the second report is an expansion of the first report, that is, it provides detailed information supporting the first report. In this manner, a one-to-many-to-many relationship may be presented in a single hypertext report, in a format which allows the reader to access as much or as little detail as desired.

In addition to drill-down capability, hypertext links also provide a means by which a system may provide "backwards links." Given a one-to-many report, for instance, every page of the report that describes a record of the many (i.e., a detail record) can have a link pointing backwards to a page containing the high-level information (i.e., master record). In other words, given a record in a detail table the corresponding record in the master table may be determined using the foreign key relationship; this foreign key relationship for traversing from the detail to the master information can thus be used to construct a backwards hypertext link. This holds true whether the detail table participates in a one-to-many report (as in the foregoing example) or whether it participates in a one-to-one report.

The system can seek out links to other apparently unrelated report components, using any available key linking the tables (or one that may be synthesized). Thus for the foregoing example of a report listing customers by sales representative, the system may automatically establish additional links, such as linking each sales representative to a personnel report which lists detailed personal information for each employee. In a similar manner, the system may automatically create a link from the customer's name to the page in the report listing detailed customer information, such as accounts payable history. Therefore, a given hypertext report can include several singular (traditional) reports, and so on, until all possible links of the tables have been exhausted. For a given relationship, such as a one-to-many relationship, if multiple paths through the same relationship exists from different tables to other different tables, a system can represent all such paths through hypertext links. The jump destination should be unique or all jump destinations should be collected into a browse sequence. Reports based on those tables may be combined into a single hypertext report, which combines all of the information as presented in all the different ways. For the user, the report is easily navigated since relevant pieces of information are cross-referenced using the system-generated hypertext links. In this manner, the user is able to easily access different pieces of information which, although traditionally reported in separate reports, can in fact be related through hypertext links in a single hypertext report.

Referring now to FIGS. 6A–D, layout and navigation of the hypertext report will now be illustrated. At its highest level, the hypertext report 600 displays "Sales Representative by Region," which is shown as page 4 topic 601. The topic lists all sales representatives by region. Under region "South," for instance, sales representative "Emerson, James" 605 is listed. As shown, the sales representative 605 is highlighted (e.g., in green and underline font) for indicating that it is jump text (i.e., can jump to more detailed information). Upon the user clicking on the jump text 605 with the screen cursor 607, the system displays detailed information for this sales representative.

The data model behind report 600 is a simple one-to-many: regions→sales representative. Report 600 may include summary information, such as "Total Sales" or "Widgets Sold" by each representative. In such an instance, the data model for the report would be extended to: regions →sales representatives→customers→orders. Here, the summary band information (e.g., "Total Sales") would be brought to the top level. The detail band information, however, would remain hidden (until the user chose to jump to it).

Figure 6A:
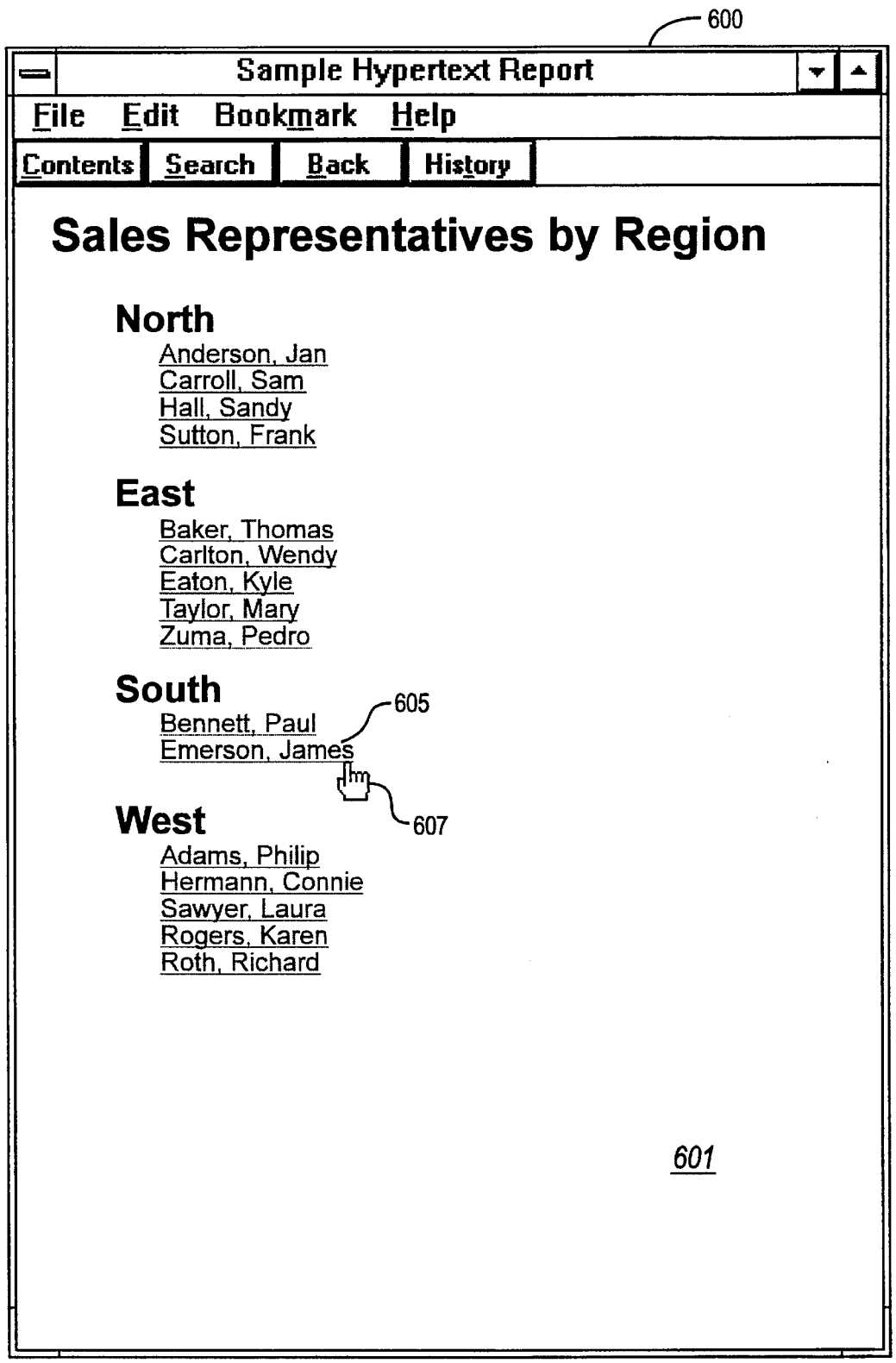
Figure 6B:
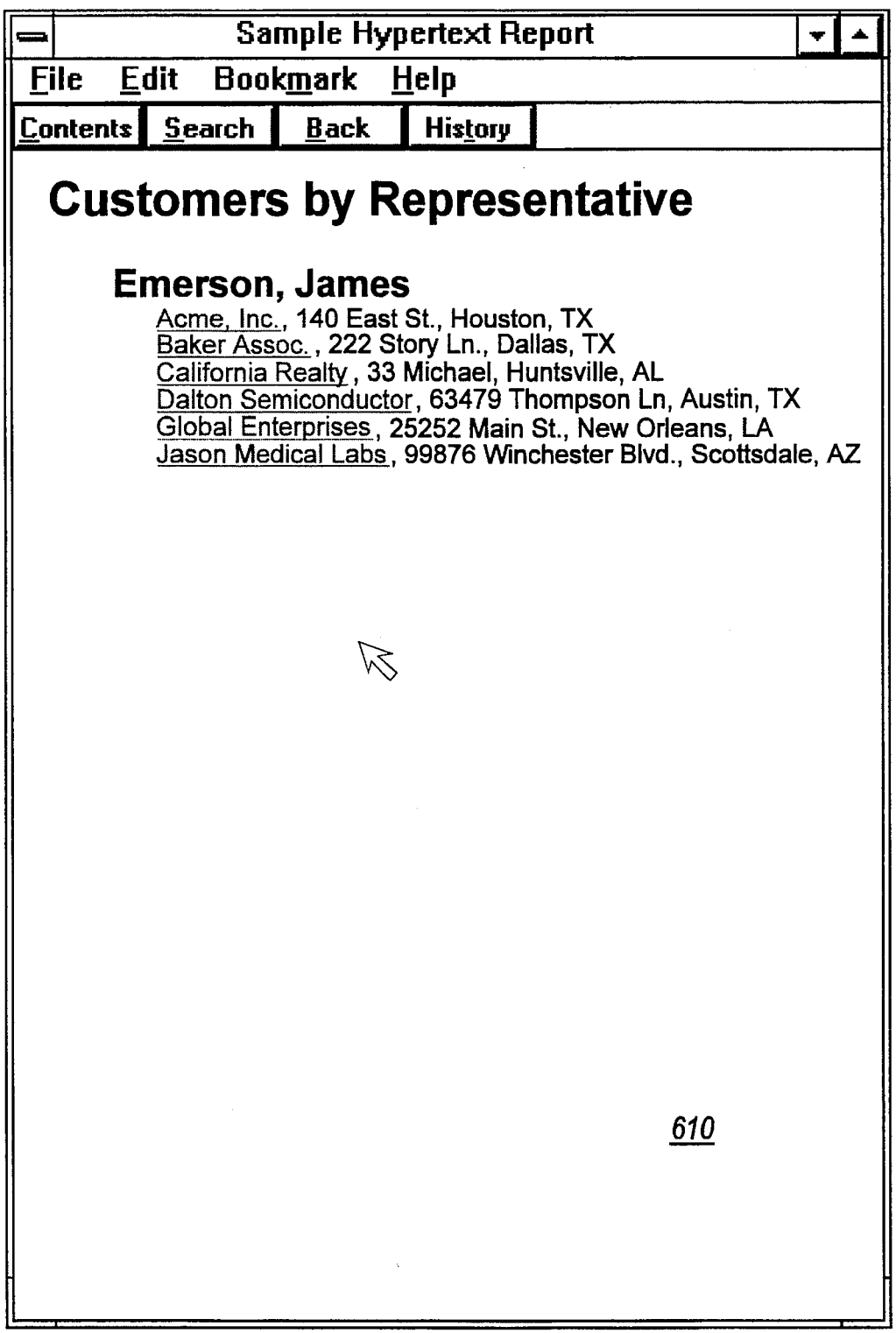
Figure 6D:
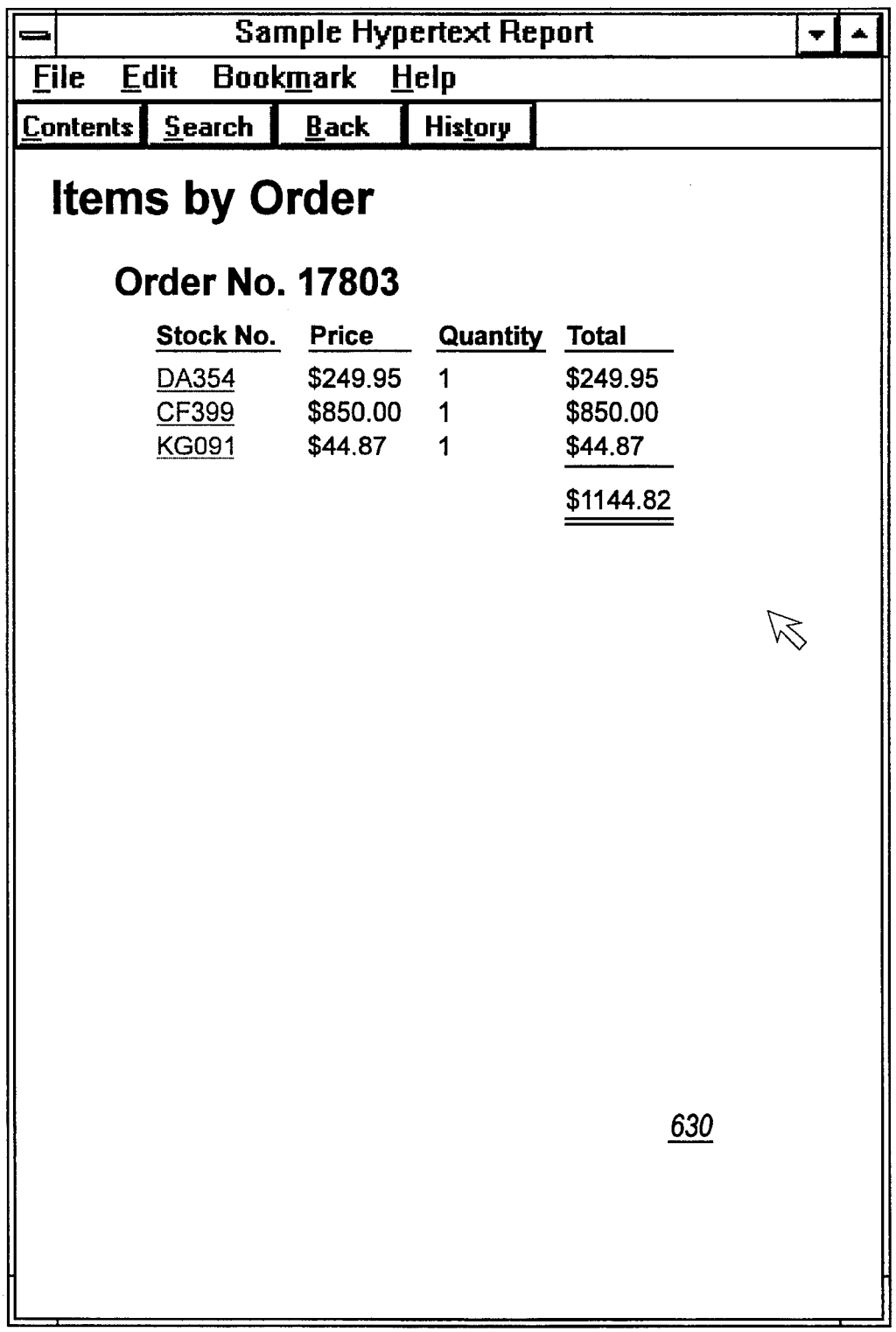
Figure 6E:
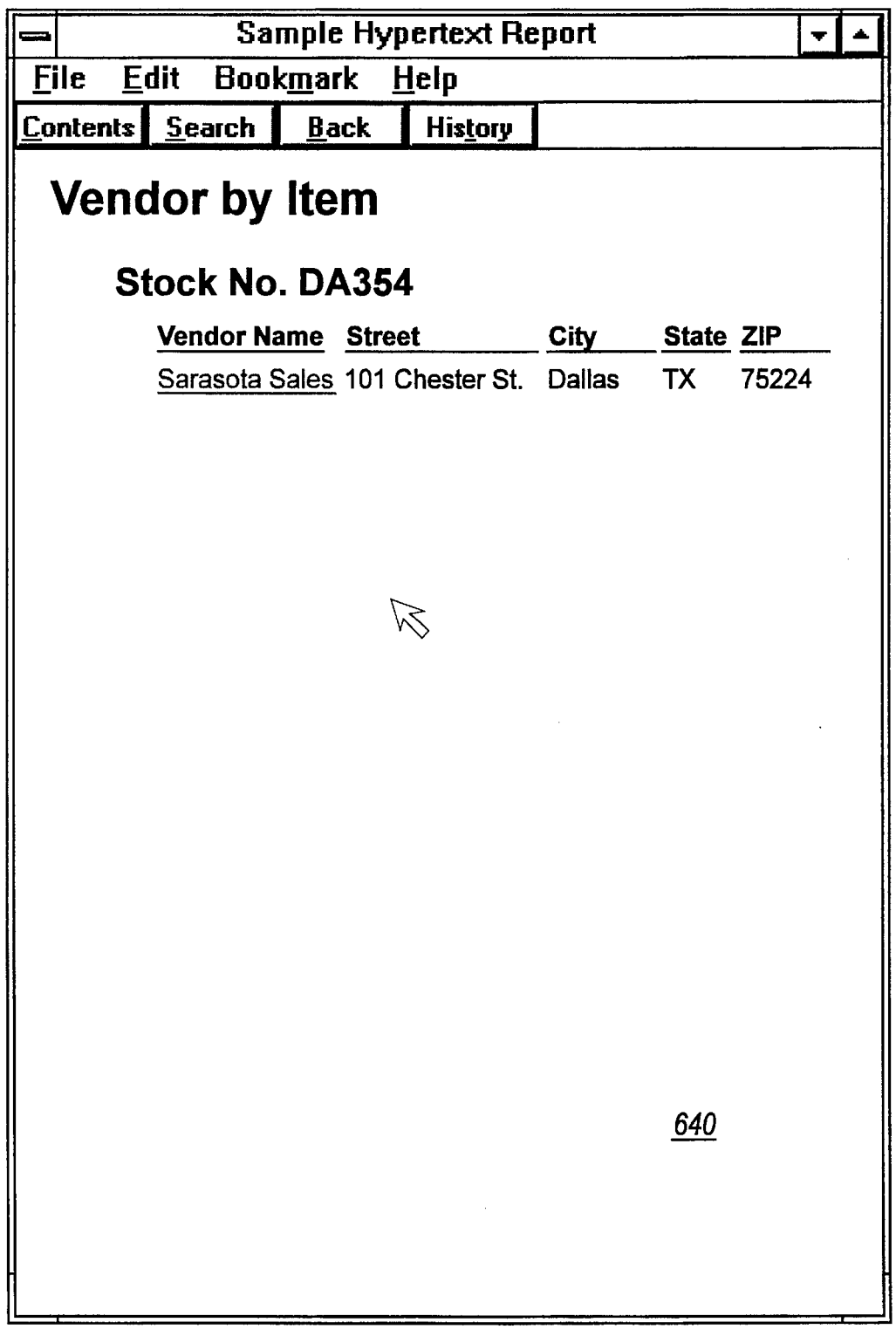

As shown in FIG. 6B, upon the user clicking jump text 605 the system displays topic 610. In particular, the topic 610 displays detailed information for this particular sales representative (James Emerson). Here a list of "Customers by Representative" is displayed for indicating customers which this sales representative services. As shown, the company names are highlighted to indicate that the company name serves as jump text to more detailed information.

Upon the user clicking on a company name, such as "Dalton Semiconductor," the system displays detailed information for that company. As shown in FIG. 6C, for instance, detailed information of "Orders by Customer" is shown for Dalton Semiconductor, on page 620 of the hypertext report. Again, portions of the report on this page are highlighted to indicate that additional detail is available (via hypertext links). Upon the user selecting an order number, such as 17803, the system displays "Items by Order" for this order number, as topic or page 630. As illustrated, each stock number for each item is highlighted, to indicate that still additional detailed information is available. The user can continue to drill down to other detail information. Upon selecting a stock number, such as DA354, the user is taken to topic 640, which presents detailed information for DA354 (e.g., vendor information). Thus the hypertext reader can traverse one of many potential paths through the hypertext report so that he or she may browse only the report information of interest. All other details which are not of interest are hidden from the reader's view.

3. Synthesis of hypertext link identifiers

The hypertext links, which are placed automatically by the system, are synthesized as follows. Each hypertext link is generated from an identified key, so that the system may automatically create a jump name which is a unique identifier. In a preferred embodiment, the unique name is based on the value stored at the key field(s) of the detail record. The reason for this is perhaps best described by way of example.

Consider two reports, the first being a one-to-many (1→M) report, the second being a one-to-many-to-many (1→M→M) report. Although the same key value is employed in both reports for effecting links, one does not want a given key value to point to the same detail page in the hypertext report. Instead, the key value should be used to jump to the appropriate detail information for the one-to-many report, and jump to the appropriate detail information for the one-to-many-to-many report.

Appropriate jump or navigation behavior is provided by giving each page or topic a jump location to that topic (e.g., at the top of the page). For example, a unique identifer can be constructed as follows:

[REPORT_NAME]_{key_value} where REPORT_NAME is the name of the report (or other unique identifier) and the key_value is constructed from the key of the current record.

Returning to the example of the reports of "Customer by Representative" and "Orders by Customer," generation of hypertext names occurs as follows. Each topic in "Orders by Customer" comprised a particular customer followed by detailed information about what the customer had ordered; linkage is provided via a foreign key on Customer ID. The report name (e.g., "Orders by Customer" above) is appended to the key value for creating a unique hypertext jump name. In this manner, each instance of a key value throughout the various reports will produce a different topic (with a unique ID), that the user may jump to. For instance, the hidden topic name or jump tag for topic 620 of FIG. 6C (i.e., "Orders by Customer" for Dalton Semiconductor) may be generated as:

ORDERS_BY_CUSTOMER_00569 where the Customer ID for Dalton Semiconductor is "000569."

As shown by the underlying RTF code 700 of FIG. 7A, the hidden identifier CUSTOMERS_BY_REPRESENTATIVE_021 (705) appears after the "Customer by Representative" title text. Thus, the Employee ID for James Emerson, 021, is used to synthesize a jump to the topic. The hidden identifier ORDERS_BY_CUSTOMER_00569 (710) appears after "Dalton Semiconductor" in the report; it, in turn, allows the user to jump to the "Dalton Semiconductor" topic for the "Orders by Customer" report. When the user clicks on the Dalton Semiconductor jump text, the system may readily locate this topic for Dalton Semiconductor (620), using the unique identifier.

Continuing in this manner, the "Orders by Customer" report may include other hypertext jumps, such as specifying customer detail information (e.g., address, phone number, and the like) which is present in another table, At all times, the appropriate jump to make to particular detail information may be readily determined by the system by employing the unique jump names which are synthesized.

Figure 7B:
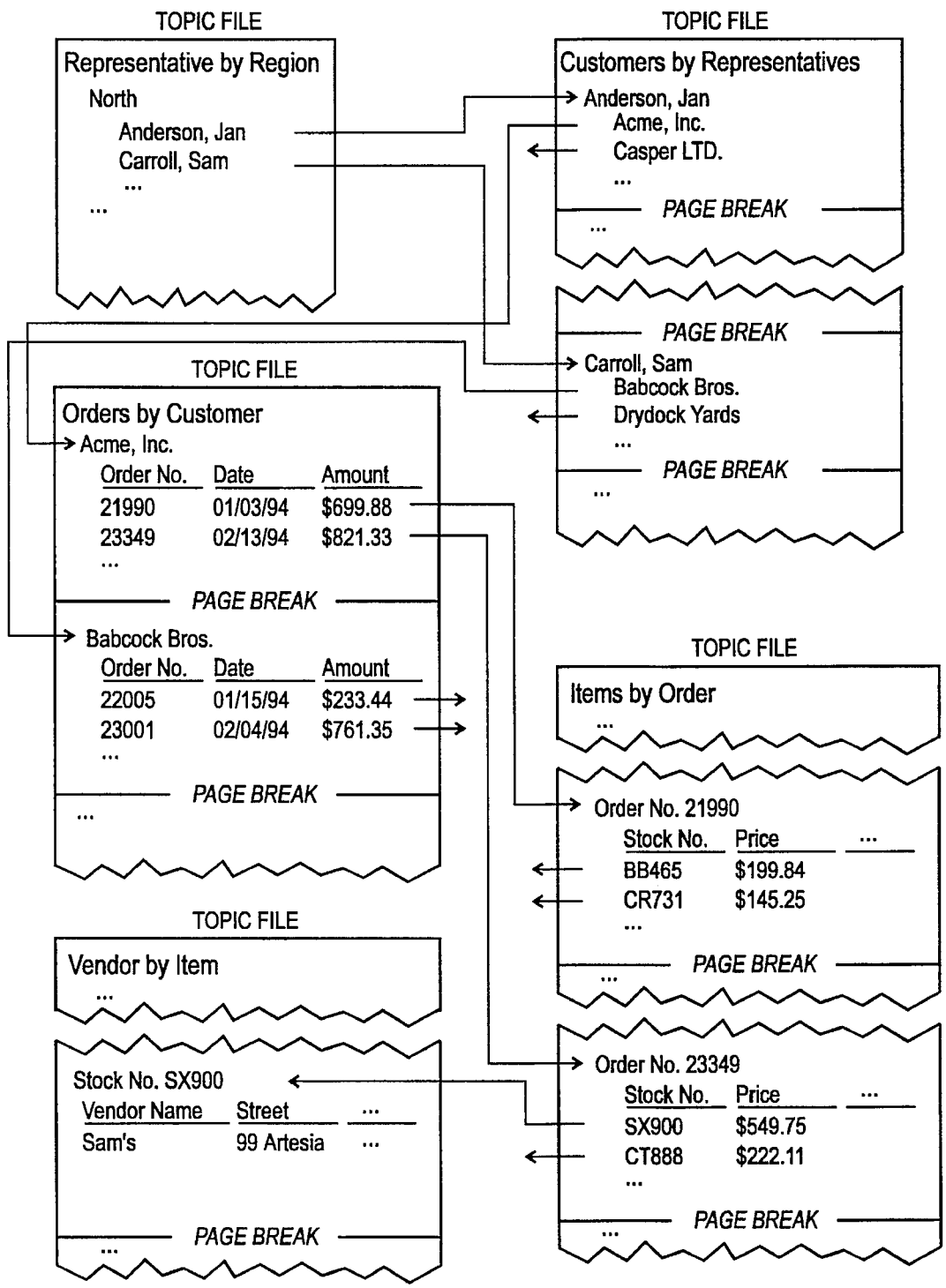
FIG. 7B is a hypertext jump diagram which illustrates how the report of FIG. 6 are related (through hypertext links).
Figure 8A:
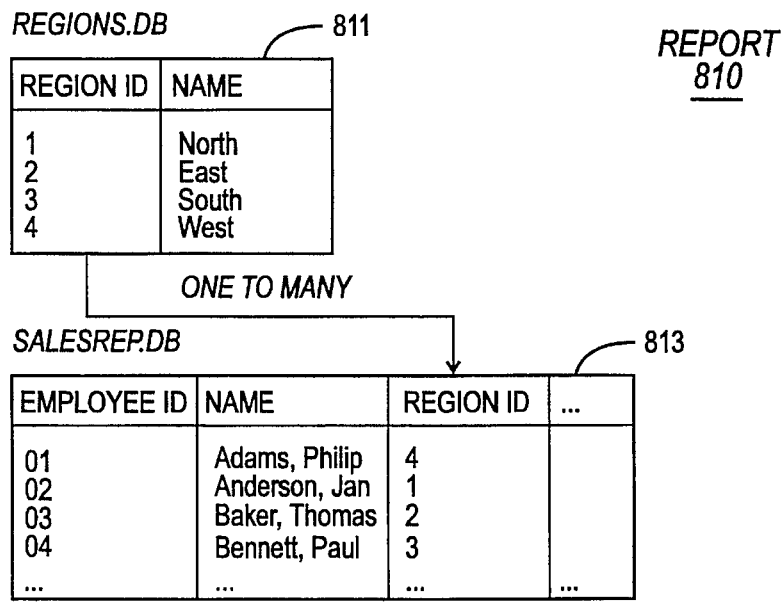
FIG. 8A–E are block diagrams illustrating underlying data models for the hypertext reports of FIG. 7.
Figure 8B:
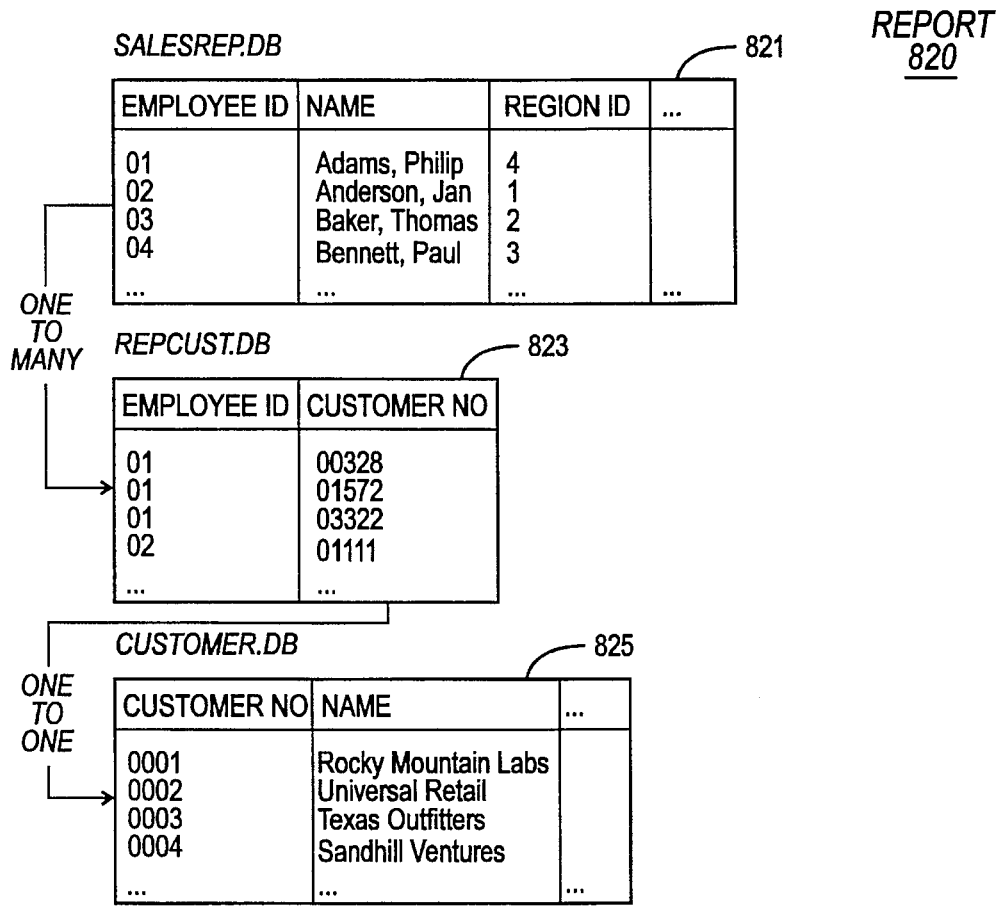
Figure 8C:
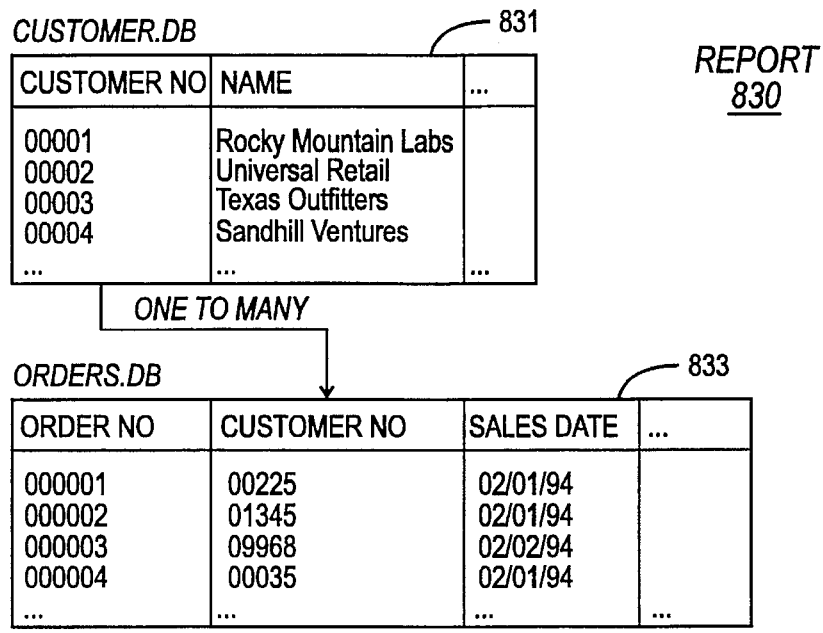
Figure 8D:
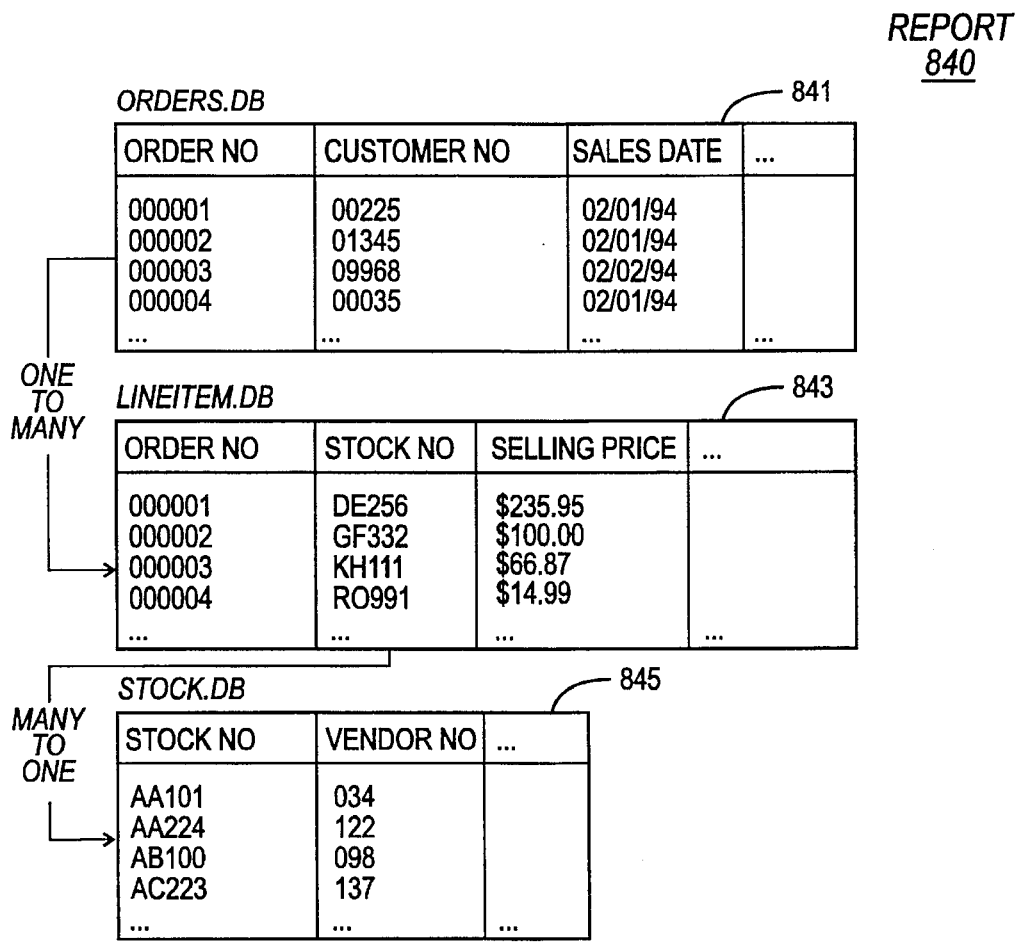
Figure 8E:
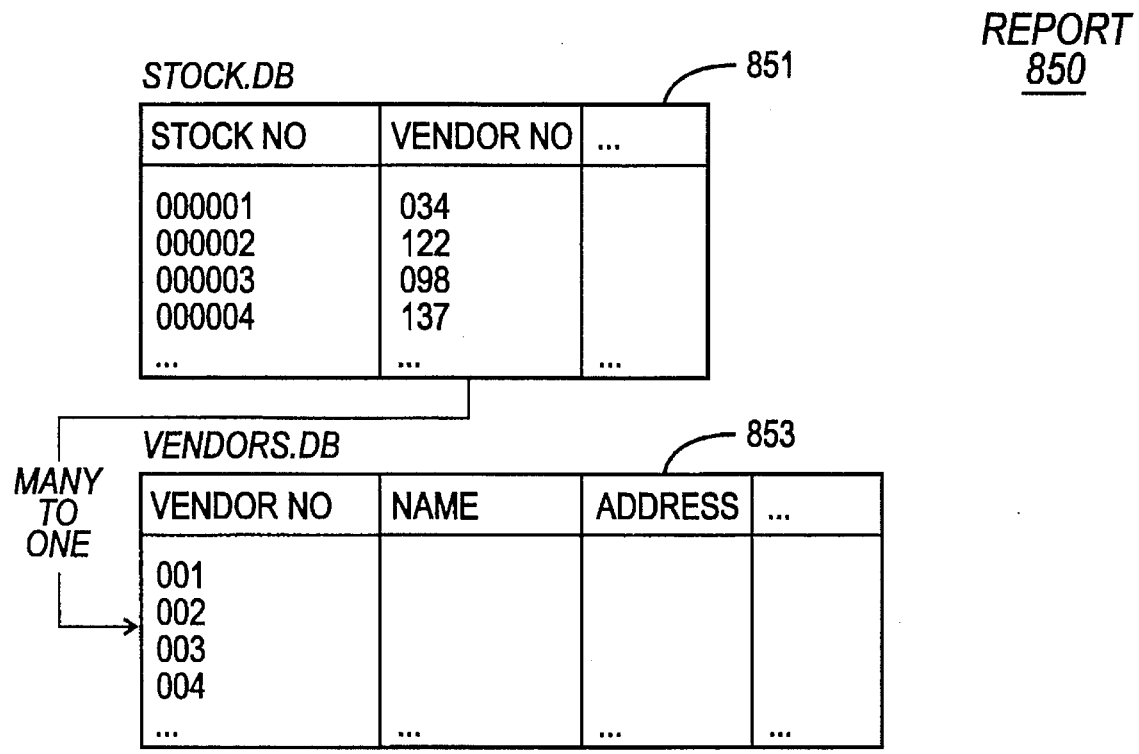

FIG. 7B presents a hypertext jump diagram 750 which illustrates the various linkages between the reports. Typically, each report is a one-to-many, with the "many" serving as the root for the next report. Each page is typically a different record in the underlying master table and lists all the dependent records.

Referring now to FIGS. 8A–E, determination of hypertext links by the system will now be described. To determine hypertext links, the underlying data model for each report is determined. For the reports 810, 820, 830, 840 and 850, the controlling data model is generally a one-to-many (or many-to-one) relation. In addition to determining the data model, the grouping desired for each report is determined. For report 810, the grouping is by Region ID, for information from tables 811, 813. For report 820, on the other hand, the grouping is by Employee ID and by Customer No, for information from tables 821, 823, 825. For report 830, the grouping is by Customer No, for information from tables 831, 833. For report 840, the grouping is by Order No and Stock No, for information from tables 841, 843, 845. Finally, for report 850, the grouping is by Vendor No, for information from tables 851, 853.

Figure 9:
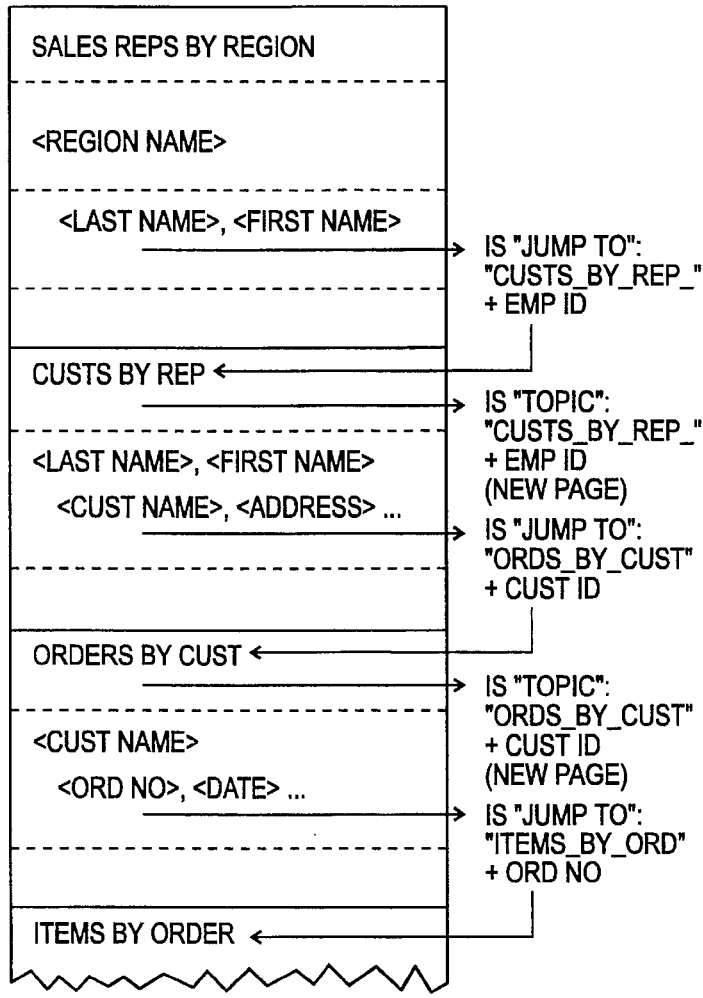
FIG. 9 is a block diagram illustrating an exemplary design layout (banded approach) for the hypertext reports of FIG. 7.

FIG. 9 shows a banded design layout 900 for the reports of FIG. 7. This schematically represents the layout of the hypertext report, as would be typically presented to the user during a design mode of the system. As shown in the layout 900, for the "Sales Representative by Region" report, the group header (i.e., the Region Name) is grouped by the Region ID and ordered by the Region ID. In the detail band, the information is ordered by Last Name. The detail band includes a "jump to" or hypertext link, "CUSTOMERS_BY_REPRESENTATIVE_.+<Employee ID>. This information can be discerned as follows. In the "Customers by Representative" report, the grouping is by Employee ID; the ordering is also by Employee ID. Given a report which is grouped by a unique index, such as Employee ID, the group header (being a unique index) can serve as a topic—jump destination. The jump identifier for this location can be synthesized from the report name and a unique key value. This is true in instances where the grouping is controlled by a unique key value. If a jump destination is not unique, however, the first member (of non-unique values) may serve as a jump location. A browse sequence may be built to guide the user to other repeating records. In other words, for non-unique records, the first instance may serve as a jump destination; each subsequent instance is concatenated onto a browse sequence which starts at the topic name.

In addition to generating a jump destination, the system must determine conditions where a link may be placed in a report which is a jump to another destination. Consider, for instance, the "Customer by Representative" report. The group band is the representative's name, which (as described above) has been determined by the system to be a topic. The topic can be synthesized from the report name and the Employee ID. For each customer name under an employee, the system embeds or "decorates" the Customer Name with an attribute for indicating that this is a link to the "Orders by Customer" report (for that particular Customer ID). The system must first decide whether in fact this can be done—that is, to know whether that detail band contains data that can be linked to a grouping expression or ordering expression in another report. The "Orders by Customer" report contains the Customer Name and ID, a grouping expression on a unique identifier. Since this is a grouping expression on Customer ID, any band that can contain the Customer ID identifier can be used to form a hypertext link, for jumping to the corresponding detail band (location) in the other report.

The hypertext linking for each report will now be described. For report 810, the grouping expression, which is a one-to-many relation, is a unique index. Therefore, each group header can serve as a jump destination, based on its index key value. The topic expression is <report name>+<group expression>. If the grouping expression is not unique, however, then the first group header can be made the topic (i.e., jump destination), and each subsequent group header (whether on the same page or another page) is "next" in a browse sequence of pages.

The detail table in report 810 is SALESREP.DB, ordered by Employee ID, which is used in report 820. Report 820's controlling order is Employee ID, which is a unique key. Therefore, any band in the report 810 can contain a link object to report 820, using the topic <name of report 820>+<Employee ID>.

For report 820, the grouping expression is a unique index, so each group header can "be" or can "contain" a topic (or jump destination), based on its key value. The detail table is CUSTOMER.DB, which is also used in report 830. Report 830's controlling order is Customer ID, which is a unique key. Therefore, any band in the report 820 can contain a link object to report 830, using the topic <name of report 830>+<Customer ID>.

For report 830, the one-to-many relationship can be described with hypertext links in a manner similar to that which was done for report 820. The one-to-many relation in report 840 can be described with hypertext links similar to that which was done for report 830. Also for report 840, the Stock No field is relatable to the Stock No field in the table STOCK.DB. This relationship is many-to-one, since the index containing the Stock No field in the stock table is unique and there is more than one item manufactured by any one vendor. Therefore, in report 840, multiple jumps to a given manufacturer can appear in the report. Finally, for report 850, the relationship is many-to-one. The hypertext links for this report may be constructed in a manner similar to that described for report 840.

Attached hereto is an Appendix containing source listings, in dBASE® Language, providing further description of the present invention, which is suitable for implementation in a general purpose digital computer system such as an IBM-compatible personal computer. A suitable interpreter for executing the code is available from Borland International of Scotts Valley, Calif.

Advantages.

The teachings of the present invention may be advantageously applied in the business setting, where access to timely information is often a key ingredient to a company's success. Consider, for instance, a busy executive who must review timely reports. Instead of having to review lengthy paper reports (and having to wade through information which is not of particular interest), a busy executive would much rather have an electronic hypertext report with an appropriate level of summary information. The executive could then drill-down to the detail information which is of particular interest. In this manner, the executive need not waste time reviewing detail information which is not interesting. Since the hypertext report is generated electronically, the entire process could be automated, such as using conventional networking technology, so that an electronic copy of the hypertext report may be automatically generated and delivered on a timely basis (e.g., daily).

While the invention is described in some detail with specific reference to a single preferred embodiment and certain alternatives, there is no intent to limit the invention to that particular embodiment or those specific alternatives. For instance, while unique identifiers may be constructed by combining a report name with particular key values, those skilled in the art will appreciate that other unique identifiers may be employed in accordance with the present invention. Thus, the true scope of the present invention is not limited to any one of the foregoing exemplary embodiments but is instead defined by the appended claims.

APPENDIX

```
; Help Project File for combining reports
; SALESREP.RTF, CUSBYREP.RTF
; by Conrad Herrmann
;    Borland International
;    7/24/94
[OPTIONS]
ERRORLOG=report.ERR
COMPRESS=NO
CONTENTS=Contents
TITLE=Hypertext Report
COPYRIGHT=Copyright , 1994, Borland International
BMROOT=d:†reports†test
ROOT=d:†reports†test
[WINDOWS]
main=,,0,,,0
[FILES].
```

APPENDIX -continued

```
salesrep.rtf
cusbyrep.RTF
Crystal Results For dBASE v3.0 - Report Definition
1.0 File Information
    Report file: Sales Representative Directory
    Last edited: 1994-7-28, 15:17
    Version: 3.0
    Data file(s):
    d:†reports†test†salesrep.qbe
2.0 Record Sort Fields
3.0 Group Sort Fields
4.0 Formulas
4.1 Record Selection Formula
4.2 Group Selection Formula
4.3 Other Formulas
5.0 Sectional Information
5.1 Header Section
    Hidden, New Page Before, Keep Together
5.2 Detail Section
    Visible
    EMPLOYEE->LNAME
        String, Default Alignment
    EMPLOYEE->FNAME
        String, Default Alignment
    EMPLOYEE->PHONE1
        String, Default Alignment
    XEMPID
        String, Default Alignment
5.3 Footer Section
    Hidden, New Page After, Keep Together,
    Print at Page Bottom
Every Designer (SALESREP.QBE)
* dBASE Windows .QBE file
CLOSE DATABASES
SET EXACT ON
SELECT 1
USE SALESREP.DBF ORDER TAG EMPID
SELECT 2
USE EMPLOYEE.DBF ORDER TAG EMPID
SELECT 1
SET RELATION TO EMPID INTO EMPLOYEE
CONSTRAIN
SET SKIP TO EMPLOYEE
SET FILTER TO FOUND(2)
SET FIELDS TO EMPID, REGION
SELECT 2
SET FIELDS TO FNAME, LNAME, ADDR1, ADDR2,
ZIP, PHONE1
SELECT 1
SET FIELDS TO XEMPID="{†uldb Customers}
{†v CUSBYREP_"+SALESREP->EMPID+"}"
GO TOP
Crystal Results For dBASE v3.0 - Report Definition
1.0 File Information
    Report file: Customers by Sales Representative
    Last edited: 1994-7-28, 15:20
    Version: 3.0
    Data file(s):
    d:†reports†test†cusbyrep.qbe
2.0 Record Sort Fields
3.0 Group Sort Fields
4.0 Formulas
4.1 Record Selection Formula
4.2 Group Selection Formula
4.3 Other Formulas
5.0 Sectional Information
5.1 Header Section
    Hidden, New Page Before, Keep Together
5.2 Group header #1: SALESREP->EMPID - A
    Visible
    XEMPID
        String, Default Alignment
    EMPLOYEE->FNAME
        String, Default Alignment
    EMPLOYEE->LNAME
        String, Default Alignment
5.3 Detail Section
    Visible
```

APPENDIX

```
XCUSTID
    String, Suppress Duplicate, Default Alignment
    CUSTOMER->COMPANY
    String, Default Alignment
5.4 Group footer #1: SALESREP->EMPID - A
    Visible, New Page After, Suppress Blank Lines
5.5 Footer Section
    Hidden, New Page After, Keep Together,
    Print at Page Bottom
Avery Designer (CUSBYREP.QBE)
* dBASE Windows .QBE file
CLOSE DATABASES
SET EXACT ON
SELECT 1
USE SALESREP.DBF
SELECT 2
USE EMPLOYEE.DBF ORDER TAG EMPID
SELECT 3
USE CUSTOMER.DBF ORDER TAG EMPID
SELECT 1
SET RELATION TO A->EMPID INTO EMPLOYEE
SELECT 2
SET RELATION TO A->EMPID INTO CUSTOMER
SET SKIP TO EMPLOYEE, CUSTOMER
SELECT 1
SET FILTER TO FOUND(2) .AND. FOUND(3)
SET FIELDS TO EMPID
SELECT 2
SET FIELDS TO FNAME, LNAME
SELECT 3
SET FIELDS TO COMPANY, CUSTID
SELECT 1
SET FIELDS TO CUSTFNAME=C->FNAME,
CUSTLNAME=C->LNAME, XCUSTID="{↑uldb "+ ;
CUSTOMER->CUSTID+"}
{↑v CUSTRPT_"+CUSTOMER->CUSTID+"}",
XEMPID= ;
"{#{↑footnote #
CUSBYREP_"+SALESREP->EMPID+"}}"
GO TOP
```

What is claimed is:

1. In a computer system, a method for generating a hypertext report, the method comprising:

receiving input specifying a first report, said first report being based on information taken from a first subset of a set of relational database tables, said set of relational database tables including records that provide access to stored information; said first report being a design document separate from said set of relational database tables and specifying display of a plurality of information items associated with records in said first subset of tables, said information items being differentiated by being associated with records having different values of a particular field in said first subset of tables;

receiving input specifying a second report, said second report being based on information taken from a second subset of said set of relational database tables, said second report being a design document separate from said set of relational database tables and specifying display of information associated with records in said second subset of tables;

combing the information items from said first report and the information from said second report into the hypertext report; and if information in said first report is relatable to information in said second report by virtue of at least one of said second subset of tables having the particular field, generating at least one hypertext link and placing said at least one hypertext link in the hypertext report for cross-referencing relatable information in the two reports, the hypertext report, when displayed to a user, allowing the user to navigate between related information at different locations in the hypertext report by invoking said at least one hypertext link.

2. The method of claim 1, wherein at least one of said reports includes a one-to-many relation.

3. The method of claim 1, wherein at least one of said reports includes a many-to-one relation.

4. The method of claim 1, where at least one of said reports includes a one-to-one relation.

5. The method of claim 1, wherein at least one of said reports includes a grouping of information based on a unique index, said grouping including at least one group header serving as a hypertext jump destination based on the value of its unique index.

6. The method of claim 1, wherein at least one report includes a grouping of information based on an index which is not unique, said grouping including a single group header having a jump destination based on the non-unique index value.

7. The method of claim 6, wherein members of the grouping which are not unique are placed into a hypertext browse sequence.

8. The method of claim 1, wherein at least one report includes a detail band ordered by a unique index, so that any other band in the hypertext report can contain a link object for accessing the detail band of the report.

9. The method of claim 8, wherein said link object is synthesized by the system based on a unique identifier.

10. The method of claim 9, wherein said unique identifier is based on a report name and a key value of the unique index.

11. The method of claim 1, wherein at least one of said reports includes a grouping of information based on a grouping expression which is a unique index, the grouping of information being associated with a topic expression which is a unique identifier.

12. The method of claim 11, wherein said unique identifier is based on a report name and a key value of the unique index.

13. A method for creating hypertext reports in a relational database management system, the method comprising:

receiving input specifying a first report of database information, said first report being based on information from a first subset of a set of relational database tables, said set of database tables including records being provide access to stored information, said first report being separate from said set of relational database tables and specifying display of information associated with records in said first subset of tables;

receiving input specifying a second report of database information, said second report being separate from said set of relational database tables and being based on information taken from a second subset of said set of relational database tables, said second report specifying display of information associated with records in said second subset of tables;

combining the information from said first report and the information from said second report into the hypertext report;

determining whether information of the first report can be linked to information of the second report by virtue of at least one common field between said first and second subsets of table; and if information of the first report can be linked to information of the second report, generating a hypertext link and placing said hypertext link in the hypertext report for cross-referencing information in the second report to information in the first report, the hypertext report, when displayed to a user, allowing the user to navigate between related information at different locations in the hypertext report by invoking said hypertext link.

14. The method of claim 13, wherein said step of generating a hypertext link includes generating a unique topic identifier for identifying the information of the second report as a topic.

15. The method of claim 14, wherein the unique topic identifier is based on a name of the second report and a value taken from information of the second report.

16. The method of claim 14, wherein said step of generating a hypertext link further includes generating a hypertext jump to said topic of the second report.

17. The method of claim 13, wherein at least one of the reports includes a one-to-many relation.

18. The method of claim 13, wherein at least one of the reports includes a many-to-one relation.

19. The method of claim 13, wherein at least one of the reports includes a one-to-one relation.

20. The method of claim 13, wherein said step of determining includes:
determining whether information of the first report can be related to information of the second report.

21. The method of claim 20, wherein said step of determining includes:
determining whether a foreign key relation exists between information of the first report and information of the second report.

22. A hypertext report system comprising:
input means for specifying a first report of relational database information from a set of relational database tables and a second report of relational database information from the set of relational database tables, said set of relational database tables including records that provide access to stored information, each of said reports representing the relational database information but being separate from the relational database tables;
means for combining said first and second reports into the hypertext report;
comparison means for determining whether information of the first report can be linked to information of the second report by virtue of at least one common field between tables in said first and second reports; and
means for generating a hypertext link and placing said hypertext link in the hypertext report for cross-referencing information in the second report to information in the first report if information of the-first report can be linked to information of the second report, the hypertext report, when displayed to a user, allowing the user to navigate between related information at different locations in the report by invoking said hypertext link.

23. The system of claim 22, wherein the hypertext link comprises a unique topic identifier for identifying the information of the second report as a topic and a hypertext jump for jumping to the unique topic identifier.

24. The system of claim 22, wherein the comparison means includes means for determining whether information of the first report can be related to information of the second report.

25. The system of claim 24, wherein the comparison means further includes means for determining whether a foreign key relation exists between information of the first report and information of the second report.

26. A method of presenting information from a plurality of reports based on, but separate from, a set of tables in a relational database system wherein
each table includes a number of records, each record having a number of fields for storing information,
said plurality of reports includes first and second reports containing information derived from respective first and second subsets of said set of tables, and
each respective subset of tables has a structure defined by fields in common between pairs of tables in the respective subset,
the method comprising:
determining a particular field in said first subset of tables that corresponds to a field in said second subset of tables;
combining said plurality of reports into a hypertext report that is separate form said set of tables;
generating hypertext links and placing said hypertext links in portions of said hypertext report that correspond to said first report, which hypertext links specify said second report and respective values for the particular field;
displaying a portion of said hypertext report corresponding to at least a portion of said first report with information based on records in said first subset of tables, the displayed information being correlated with the particular field, at least a portion of the displayed information for each record denoting a respective one of said hypertext links; and
in response to user input specifying a given hypertext link in said hypertext report corresponding to a given value of the particular field, displaying a portion of said hypertext report corresponding to at least a portion of said second report with information based on records in said second subset of tables, the displayed information for said second report being correlated with records having the given value of the particular field, the hypertext report thus allowing the user to navigate between related information at different locations in the hypertext report by invoking said hypertext links.

27. The method of claim 26 wherein said plurality of reports includes a third report containing information derived from a third subset of tables, and the method further comprises:
determining a further particular field in said second subset of tables that corresponds to a field in said third subset of tables;
generating additional hypertext links and placing said hypertext links in portions of said hypertext report that correspond to said second report, which hypertext links specify said third report and values for the further particular field;
in connection with said step of displaying said second report, displaying at least a portion of the displayed information correlated with each record with an indication denoting a respective one of said additional hypertext links; and
in response to user input specifying a given additional hypertext link in said hypertext report corresponding to a given value of the further particular field displaying a portion of said hypertext report corresponding to said third report with information based on records in said third subset of tables, the displayed information for said third report being correlated with records having the given value of the further particular field.

28. The method of claim 26 wherein said first and second subsets of tables have at least one table in common, said table in common including said particular field.

29. The method of claim 26 wherein said information displayed in said first report includes information derived from records in a single table.

30. The method of claim 26 wherein each of said first and second subsets has at least one table linked to another table in a one-to-many relationship.

31. The method of claim 26 wherein at least one of said first and second subsets has at least one table that is not a table of the other of said first and second subsets.

32. A method of presenting information based on a set of tables, in a relational database system wherein each table includes a number of records, each record having a number of fields, the method comprising:

providing a first report containing information based on records in a first subset of tables, including information that is correlated with a particular field in said first subset of tables;

providing a second report containing information based on records in a second subset of tables, including information that is correlated with said particular field;

combining said first and second reports into a hypertext report document that is separate from aid set of tables;

establishing respective hypertext links and placing said hypertext links in said hypertext reports for portions of information in said first report that correlate with respective given values of the particular field, said hypertext link for a given portion of information in said first report specifying a portion of information of said second report that is characterized by records in said second subset of tables having the value of said particular field in said given such record, the hypertext report, when displayed, allowing the user to navigate between related information at different locations in the hypertext report by invoking said hypertext links.

33. The method of claim 32 wherein said first and second subsets of tables have at least one table in common, said table in common including said particular field.

34. The method of claim 32 wherein said information displayed in said first report includes information derived from records in a single table.

35. The method of claim 32 wherein each of said first and second subsets has at least one table linked to another table in a one-to-many relationship.

36. The method of claim 32 wherein at least one of said first and second subsets has at least one table that is not a table of the other of said first and second subsets.

37. A method of presenting information from a plurality of reports based on, but separate from, a set of tables in a relational database system wherein each table includes a number of records, each record having a number of fields, and said plurality of reports includes first and second reports containing information derived from respective first and second subsets of said set of tables, the method comprising:

determining a particular field in said first subset of tables, which particular field has key values that are at least partly matched by values in said second subset of tables;

combining said plurality of reports into a hypertext report that is separate from said set of tables;

generating hypertext links and placing said hypertext links in portions of said hypertext report that correspond to said first report, which hypertext links specify said second report and respective values for the particular field;

displaying a portion of said hypertext report corresponding to at least a portion of said first report with information based on records in said first subset of tables, the displayed information including portions correlated with different values for the particular field;

displaying in said first report an indication denoting said hypertext links; and in response to user input specifying a given hypertext link in said hypertext report corresponding to a given value of the particular field, displaying a portion of said hypertext report corresponding to said second report with information based on records in said second subset of tables, the displayed information for said second report being correlated with records having the given value of the particular field, the hypertext report thus allowing the user to navigate between related information at different locations in the hypertext report by invoking said hypertext links.

38. The method of claim 37 wherein said plurality of reports includes a third report containing information derived from a third subset of tables, and the method further comprises:

determining a further particular field in said second subset of tables, which further particular field has key values that are at least partly matched by values in said third subset of tables;

generating additional hypertext links and placing said hypertext links in portions of said hypertext report that correspond to said second report, which hypertext links specify said third report and values for the further particular field;

in connection with said step of displaying said second report, displaying in said second report an indication denoting said additional hypertext links; and in response to user input specifying an additional hypertext link in said hypertext report corresponding to a given value of the further particular field, displaying a portion of said hypertext report corresponding to said third report with information based on records in said third subset of tables, the displayed information for said third report being correlated with records having the given value of the further particular field.

39. The method of claim 37 wherein said first and second subsets of tables have at least one table in common, said table in common including said particular field.

40. The method of claim 37 wherein said information displayed in said first report includes information derived from records in a single table.

* * * * *